US012603526B1

(12) United States Patent
Bhuva et al.

(10) Patent No.: US 12,603,526 B1
(45) Date of Patent: Apr. 14, 2026

(54) HYBRID WIRELESS POWER DEVICE AND METHOD

(71) Applicant: Kitchenery Inc., Tampa, FL (US)

(72) Inventors: Akshay Bhuva, Tampa, FL (US);
Antonio Agustin Mendez Delgado,
Seville (ES)

(73) Assignee: Kitchenery Inc., Tampa, FL (US)

( * ) Notice: Subject to any disclaimer, the term of this
patent is extended or adjusted under 35
U.S.C. 154(b) by 0 days.

(21) Appl. No.: 18/504,419

(22) Filed: Nov. 8, 2023

Related U.S. Application Data

(60) Provisional application No. 63/423,555, filed on Nov. 8, 2022.

(51) Int. Cl.
H02J 50/12 (2016.01)

(52) U.S. Cl.
CPC .................................... H02J 50/12 (2016.02)

(58) Field of Classification Search
CPC ....................................................... H02J 50/12
See application file for complete search history.

(56) References Cited

U.S. PATENT DOCUMENTS

| | | | | | |
|---|---|---|---|---|---|
| 6,826,267 | B2 * | 11/2004 | Daum | ................. | H04L 12/2818 |
| | | | | | 379/102.01 |
| 6,953,919 | B2 * | 10/2005 | Clothier | ................. | H05B 6/062 |
| | | | | | 219/494 |
| 7,795,562 | B2 * | 9/2010 | de Rooij | ................. | H05B 6/44 |
| | | | | | 336/146 |

| | | | | | |
|---|---|---|---|---|---|
| 7,948,208 | B2 * | 5/2011 | Partovi | ................. | H02J 7/0013 |
| | | | | | 320/108 |
| 9,283,858 | B2 * | 3/2016 | Boys | ................. | H02J 50/10 |
| 9,614,964 | B2 * | 4/2017 | Stepanian | ................. | G06F 21/32 |
| 10,445,656 | B2 * | 10/2019 | Sanchez | ................. | G06N 20/00 |
| 10,505,402 | B2 * | 12/2019 | Lee | ................. | H02J 50/005 |
| 11,064,576 | B2 * | 7/2021 | Moon | ................. | H05B 6/065 |
| 2011/0192830 | A1 * | 8/2011 | Wilson | ................. | F24C 7/10 |
| | | | | | 219/386 |
| 2012/0051009 | A1 * | 3/2012 | Tang | ................. | H05B 6/1254 |
| | | | | | 361/752 |

(Continued)

FOREIGN PATENT DOCUMENTS

| | | | | |
|---|---|---|---|---|
| CA | | 2625765 C | 6/2015 | |
| WO | WO-2012132274 A1 * | 10/2012 | ............. | H05B 6/065 |

OTHER PUBLICATIONS

Behzad Sinafar et al., Power and Frequency Control of Induction Furnace Using Fuzzy Logic Controller, Department of Electrical Computer Engineering, Sharif University of Technology, Tehran, Iran et al., 5 pages.

(Continued)

*Primary Examiner* — Rexford N Barnie
*Assistant Examiner* — Michael J Warmflash
(74) *Attorney, Agent, or Firm* — Paradies Law P.A.

(57) ABSTRACT

A hybrid wireless power device comprises a single coil operated at two or more resonance frequencies. For example, a control circuit controls the voltage applied across a power transmission coil of a hub, and a frequency control circuit comprises a switch, such as a solid state relay, for switching between a first capacitance and a second capacitance for shifting the resonance frequency from a first resonant frequency to a second resonant frequency.

34 Claims, 13 Drawing Sheets

(56) References Cited

U.S. PATENT DOCUMENTS

| | | | |
|---|---|---|---|
| 2013/0319992 A1* | 12/2013 | Meusburger | H05B 45/18 |
| | | | 315/297 |
| 2014/0215065 A1* | 7/2014 | Fisher | H04L 12/281 |
| | | | 709/224 |
| 2016/0336804 A1* | 11/2016 | Son | H02J 50/12 |
| 2017/0164777 A1* | 6/2017 | Everett, Jr. | H05B 6/1272 |
| 2017/0245327 A1* | 8/2017 | Viroli | G05D 23/1919 |
| 2018/0025838 A1* | 1/2018 | Som | H05B 6/1254 |
| | | | 361/143 |
| 2020/0196398 A1* | 6/2020 | Ok | H05B 6/065 |
| 2021/0108803 A1* | 4/2021 | Johnson | F24C 15/325 |
| 2021/0186249 A1* | 6/2021 | Nam | H05B 6/1272 |
| 2021/0274604 A1* | 9/2021 | Lee | H02J 50/60 |
| 2021/0274607 A1* | 9/2021 | Seong | H05B 6/062 |
| 2021/0298136 A1* | 9/2021 | Moon | H05B 6/062 |
| 2022/0146112 A1* | 5/2022 | Johnson | F24C 15/322 |
| 2022/0264710 A1* | 8/2022 | Kim | H05B 6/6473 |
| 2022/0268447 A1* | 8/2022 | Farrel | F24C 15/023 |

OTHER PUBLICATIONS

Pradeep Vishnuram et al., Induction Heating in Domestic Cooking and Industrial Melting Applications: A Systematic Review on Modelling, Converter Topologies and Control Schemes, Energies 2021, 14, 6634, 34 pages.

* cited by examiner

Figure 13:
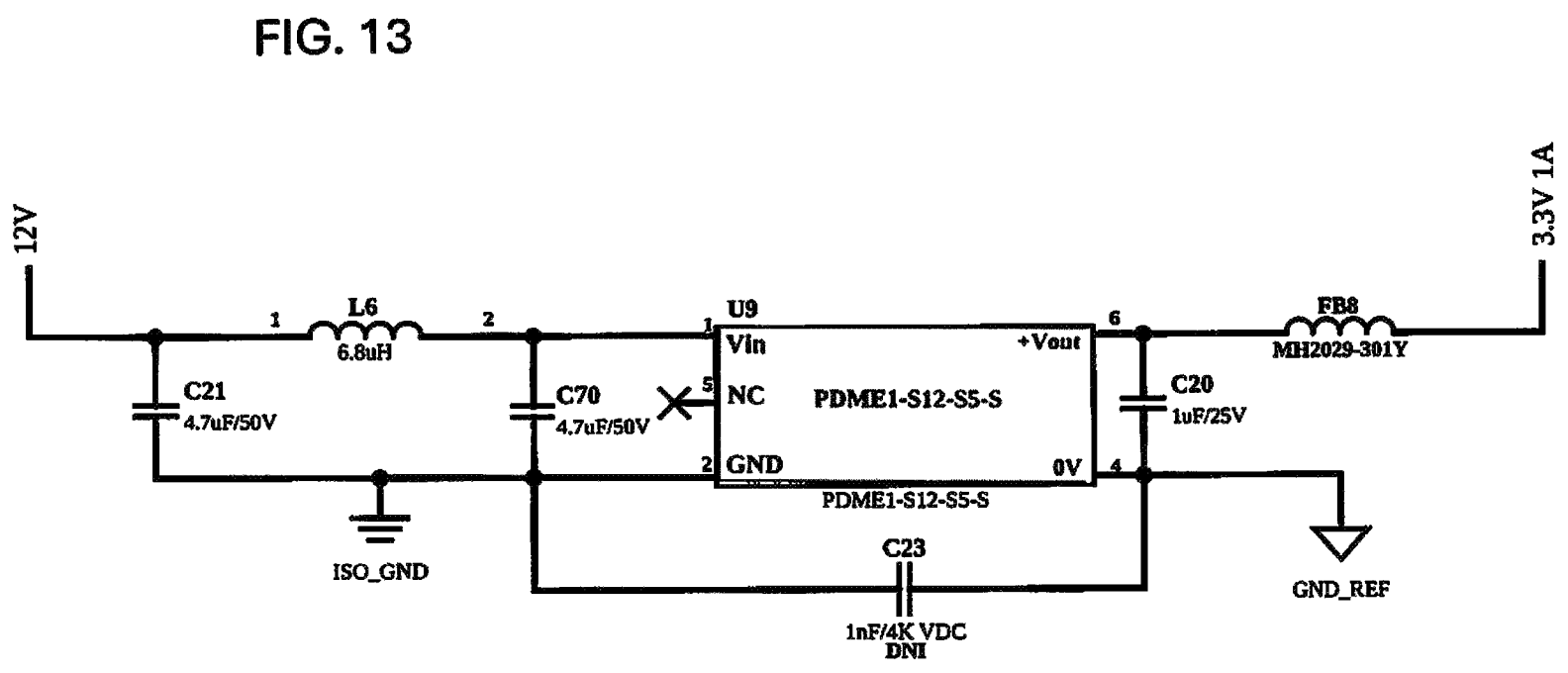

GND_REF

6

+Vout

U9
Vin

PDME1-S12-S5-S

0V

4

C23
1nF/4K VDC
DNI

PDME1-S12-S5-S

NC
3

GND
2

C70
4.7uF/50V

2

L6
6.8uH

ISO_GND

1

C21
4.7uF/50V

12V

HYBRID WIRELESS POWER DEVICE AND METHOD

CROSS RELATED APPLICATION

This application is a U.S. non-provisional application which claims priority to U.S. provisional application No. 63/423,555, which was filed Nov. 8, 2022, and is hereby incorporated by reference herein in its entirety.

FIELD OF THE INVENTION

The field relates to wireless inductive power transfer devices.

BACKGROUND

It is known to use inductive heating to heat pans on a range. These types of inductive cooktops are popular, because the surface is easy to clean and heating is efficient. Inductive heating is safer than other methods. An inductive coil is selected and operated at a frequency that induces heating of pans. Manufactures select a single frequency within a range that varies from 24 kHz to 1 MHz. A higher frequency of alternating current in an inductive coil is capable of inducing heating in more types of metal pans, while lower frequencies may be suitable only for pans with bottoms made of ferromagnetic materials. However, nonferrous metals are less efficient than ferromagnetic metals, even at higher frequencies. Many inductive heating cooktops are designed to operate at lower frequencies that cannot heat copper and aluminum pans. Instead, current and voltage detection in the main control unit determines whether a pan made of an appropriate material is present, and if not, then no alternating current is provided to the coil.

Networked appliances may require authentication or pairing to operate with each other or other devices. Pairing is known for devices that use communications such as Bluetooth and the like. Alternatively, U.S. Pat. No. 6,826,267 discloses a way of verifying the identity of an authorized appliance, and US Pat. Publ. No. 2014/0215065 discloses networking of a plurality of appliances in a network architecture. Many methods are known in the art for secure sharing of information among and between appliances and/or a centralized server.

Inductive heating works by imposing an alternating current in a coil that induces eddy currents in a metal surface in proximity to the coil. Electrical resistance of the metal to eddy currents imposed by the electromagnetic field from the coil generates heat within the pan, itself. Known circuits operate at a single frequency or frequency range for inductive heating of pans, although the range is increasing over time, which tends to incorporate more pans with more types of metal. Heating the metal bottom of a pan via an induction coil instantaneously induces heating of the pan with less losses to the environment than heating elements and gas cook tops. The cook top surface may be of any temperature resistant material that does not interfere with the electromagnetic field. Typically, a glass-ceramic surface is used that has a low coefficient of thermal expansion. The cook top, itself, does not become heated by the coil, but the portion of the cook top that is in direct contact with the bottom of a pan may be heated by radiant, convective and/or conductive heat transfer. This is usually a much lower temperature than the pan, particularly if the surface is made of a material with poor thermal heat transfer characteristics. Safety advantages include the comparatively low temperature of the cook top, no explosive hazards that occur from gas leaks, and no air pollution within a kitchen that may occur via inefficient burning of natural gas or propane. However, with all the advantages of inductive heating for cooktops, adoption of induction heating for cooktops has been slow. There is no compelling reason to replace lower cost burners and existing cooktops with inductive cooktops.

Control circuits are necessary to prevent lower frequency circuits from operating when nonferrous pan materials, such as copper and aluminum, are used, or when no pan has yet been placed on the cooktop. It is possible to sense the presence of an appropriate pan as a characteristic load, when the pan is placed over a coil. In contrast, a low load condition may be detected when a coil is not coupled to a surface that is capable of being heated efficiently by the coil. If a pan of the appropriate type is placed above a coil, then a load is detected and the coil remains activated. In this way, inductive heating cook tops are capable of preventing a coil from operating when no pan or the wrong type of pan is placed over an active coil. Also, a level of heating may be set by a user, and the coil may be operated for shorter periods of time to reduce heating or longer periods of time to increase heating. Pulse width modulation may be used to adjust the temperature that the pan reaches.

Induction heating for cook tops takes power from a source, such as 120 Volt alternating current at a frequency of 50 Hz or 60 Hz, and converts it to a voltage and frequency suitable for induction heating. This can be done in a single step, converting directly from a source of alternating current to a different frequency and voltage of alternating current, or two steps, converting AC power to DC and then inverting the DC power to the desired alternating current and voltage. In practice, it is known how to use a rectifier to convert AC to DC. Then, capacitors may be used to filter the output to avoid voltage spikes, and a high frequency inverter may be used to output an alternating current to a copper coil when a load is present. Also, manufacturers may include temperature measurement to infer if a pan is being heated beyond a threshold temperature.

Inductive charging devices are known that allow energy to be transferred wirelessly from a charging pad to a device to be charged. For example, a coil of the prior art is represented in FIG. 5, which shows an example of a conductive coil 501, a non-ferrous structural element 502, and ferromagnetic elements 503 that form an inductive transmission coil, as illustrated and described in U.S. Pat. Publ. 2012/0051009. Current in the coil causes magnetic flux in the ferrite elements 503 resulting in flux lines propagating outward from one end to the other end of the ferrite bars, for example, in a path containing the coil that may be thought of as a semi-elliptical, three-dimensional electromagnetic field.

In U.S. Pat. No. 7,948,208 a coil in the wireless charger system is driven by switching a FET at a resonance frequency of the circuit when a device with a receiver is present. Without the receiver nearby, the circuit is detuned from resonance and radiates minimal electromagnetic induction, with a capacitor that acts as a reservoir of energy that discharges during switch off time and enhances energy transfer. Thus, the circuit manages power to receivers by detuning the coil from the resonance frequency (off) or tuning the circuit to the resonance frequency of the coil (on). In one embodiment, the circuit includes a Zener diode that reduces the sensitivity to placement of a device's receiver on a wireless charging system. The Zener diode may be used for fixing a voltage and reducing inefficiency when a device is placed out of alignment with a transmission coil.

Generally, known inductive coils are designed to either heat cookware or power devices but not both. Innovation in induction heating (cookware) technology is directed toward producing higher resonance frequencies, which allow more types of metal cookware to be used with a single coil. Innovation in battery charging is directed toward improving efficiency and reducing losses due to misalignment between device receivers and transmission coils. For example, U.S. Pat. No. 7,948,208 discloses overlapping stacked coils and electronic circuitry for selecting the coils to be used to charge a device placed on a charging pad.

U.S. Pat. No. 10,505,402 compares the benefits of a single high power transmission coil compared to a dual coil design. For high power applications, like powering appliances at 200 Watts to 2.4 kiloWatts, a single coil is disclosed as having better efficiency and less complexity compared to a dual coil system. Control of the power may be controlled by the phase (in phase/out of phase), duty cycle (on/off), duty ratio, or voltage amplitude. A particular resonant frequency is selected that is paired with the resonant frequency of a medium/high power device (secondary/receiver coil) being powered by the single coil (primary/transmitter coil). Separately, communications between the power transmission device and the power receiving device may be provided by a separate communications antenna using time division multiplexing. It's unclear whether this additional antenna is used for low power transfer, but it appears to be in at least one embodiment, in which the antenna is a identified as an additional communications coil. If the communications coil is used for low power devices, then this single coil design actually incorporates dual coils for powering different types of devices. One of the ways of managing power in the power coil is to cycle the resonant frequency in phase (resonance) or out of phase (no resonance). The only other way for managing power in the control circuit, in the only embodiment described in the detailed description, is duty cycle (on/off). Full on and full in phase is for highest power, while operating out of phase and/or reducing the duty cycle may be used to lower the power to medium power devices.

In contrast, U.S. Pat. No. 7,795,562 discloses the benefits of a dual coil design for induction heating applications. In this issued patent, two coils are used with different resonant frequencies, one for ferromagnetic pans and one for non-ferrous pans that require a higher frequency to generate heat. Each coil operates at a particular resonance frequency. A method for coupling power to a load is disclosed that includes " . . . sweeping at least one of the resonant circuits with a variable frequency power . . . " of a load (pan) placed above the pair of coils, " . . . detecting a resonant frequency response corresponding to the interaction between the load and at least one of the resonant circuits . . . ," and " . . . powering at least one of the resonant circuits at a frequency corresponding to the detected resonant frequency." The application teaches away from switching between coils. Instead, the dual coils are powered in parallel, because it is " . . . advantageously recognized that by tuning the ferrous metal series resonant circuit . . . ," at a first frequency " . . . and by tuning the non-ferrous metal series resonant circuit . . . at a different frequency," a single, variable frequency source may be " . . . changed to accommodate ferrous and non-ferrous . . . without requiring any electro-mechanical switching of voltage . . . " By matching " . . . resonant frequencies to respective loads presented by ferrous and non-ferrous metal cooking vessels . . . ," power is efficiently transferred to the load, regardless of composition of the pan. Thus, dual coils are preferred to a single coil, because electromechanical switching results in premature failures, especially at high frequencies.

Therefore, it is known to use a single coil at a single resonant frequency for charging and powering high energy devices, and it is known to use dual coils at two different resonant frequencies for inductive heating of pans due the differences in the types of metals for pans. Whether you choose one or the other depends on the circumstances.

What is not known is a way to power low energy devices, high energy devices and inductively heat pans with a single coil, without incurring undue losses in efficiency.

SUMMARY

A hybrid power transmitter comprises a hybrid hub circuit that is capable of being used for powering appliances, charging mobile device batteries, and heating pans using a single coil operating at a plurality of resonant frequencies. For example, a hybrid power transmitter utilizes a single transmission coil to transfer power from the transmission coil to a receiving device, operating at two or more resonant frequencies. In one example, a receiving device may be a pan, and the energy transferred from a coil heats the pan. The pan may have a bottom portion of the pan that is heated by the electromagnetic field generated by the transmission coil. For example, the coil may be embedded in a heat resistant material that allows electromagnetic fields from the coil to pass through the heat resistant material with little or no loss. The pan, positioned on the heat resistant material, has currents induced within the pan by the electromagnetic field extending from the coil. Eddy currents in the material of the pan introduce losses that generate heat, heating the pan. In this application, the transmission coil is operated at a first resonance frequency of the coil using a resonant circuit that applies a voltage across the coil at one of a plurality of resonance frequencies of the coil. The resonance frequency is selected for the induction heating function of the transmission coil. The transmission coil may sweep the plurality of resonant frequencies of the transmission coil, detecting a resonant frequency response corresponding to a pan positioned on the surface of the heat resistant material, over the transmission coil, the interaction between the load and at least one of the resonant circuits being detected in electromagnetic feedback to the transmission coil from the load.

BRIEF DESCRIPTION OF THE DRAWINGS

The following drawings are illustrative examples and do not further limit any claims that may eventually issue.

FIG. 13 illustrates another example of a DC/DC converter.

When the same reference characters are used, these labels refer to similar parts in the examples illustrated in the drawings.

DETAILED DESCRIPTION

Figure 1:
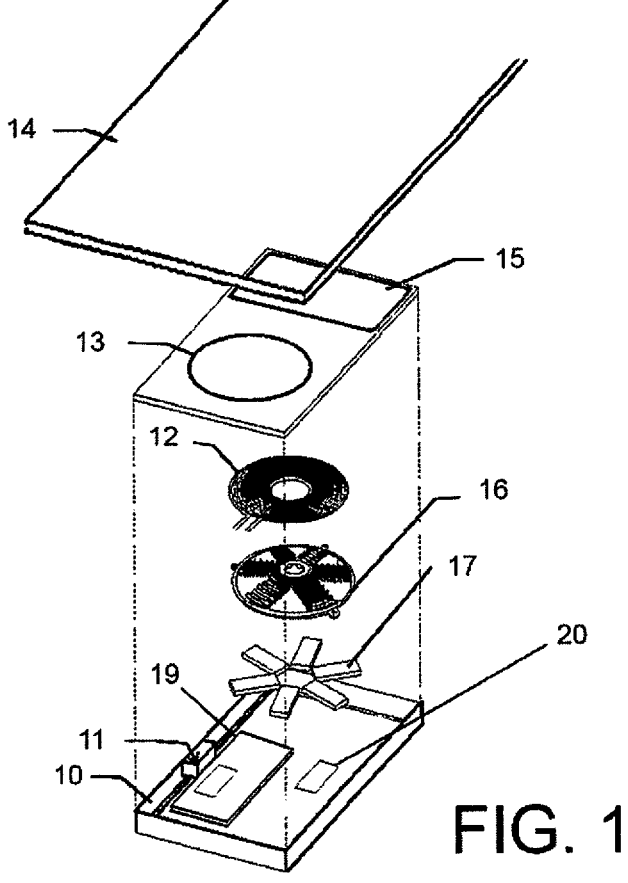
FIG. 1 illustrates an example of hybrid wireless power device.

The example in FIG. 1 illustrates a hybrid wireless power device for powering remote receivers such as pans, battery operated wirelessly chargeable devices and non-battery operated wirelessly powered devices. For example, a lower electronics housing 10 may enclose circuitry 19 that operates a hybrid wireless power device for transmitting power to a power receiver. A communications circuit 20 may comprise a separate communications antenna for communicating between the hybrid power device and the power receiver, which may be a portion of a pan, a battery operated wirelessly chargeable device or a non-battery operated wirelessly powered device.

For example, a non-battery operated wirelessly powered device may be a kitchen appliance, such as a toaster, blender, microwave, mixer, coffeemaker, toaster, pressure cooker, air fryer, rice cooker, ice cream maker, and the like. A protective surface 14 may cover a display 13, 15, such as a light emitting diode display, which may be disposed below the protective surface 14. This surface may be light transmissive. In one example, the protective surface is transparent. For example, the surface may be made of a transparent ceramic or glass. For example, the protective surface 14 may be made of a chemically strengthened alkali-aluminosilicate or a ceramic, such as a polycrystalline, transparent ceramic material. This surface may be as thin or thick as needed to protect a display and/or transmission coils and controls disposed below the surface.

Preferably, protective surfaces and any displays are as thin as required to provide the required protection and functionality. An insulating space and/or material may be provided between a protective surface and the OLED display, for example. A power transmission coil 12 may be aligned with an illuminated portion 13 of a surface, wherein the illuminated portion does not interfere with transmission of power between the transmission coil of the hybrid wireless power device and the receiving coil of a power receiving device.

In one example, an illuminated portion of hybrid power transmission device may comprise a light emitting diode or diodes that are wirelessly energized by an activated power transmission coil such that the illuminated portion 13 illuminates. Alternatively, the illuminated portion may be coupled to a connector 11 and may be powered by the circuit 19. Either way, the illuminated portion intuitively suggests the best location for the device in relation to the transmission coil 12. In addition, another portion 15 may display additional information that may be used to prompt a user to position the device on the illuminated portion 13 or an audible instruction may instruct a user to position the device on the illuminated portion 13, for example.

In one example, controls may be displayed on a display portion 15 of the power transmission device, and sensors, such as touch sensitive capacitive sensors may be used to control the power transmission device, the receiving device, or both the transmission device and the receiving device. For example, the controls 15 may be coupled to the circuit 19, which may be coupled to the receiving device via a communications circuit 20. In the example shown, the controls are disposed on a portion of the hybrid power transmission device that is not directly above a transmission coil. This display may use capacitive touch or other touchscreen technology for control of the appliance via displayed user controls. Alternatively, the controls may be analog or digital controls, such as knobs or sliders or the like.

In one example, the transmission coil 12 may be supported by a structural element 16, which may couple the coil 12 with ferrites 17 as illustrated in the example of FIG. 1, for example. The protective surface and display surface may be embedded in a surface of a countertop or may form a portion of the surface of a countertop, for example. For example, each power coil for transmission or reception may be selected with a predetermined number of turns, gage, type and length to efficiently transfer energy at the predetermined resonance frequency. For example, a single transmission coil may be selected to have the following: a number of turns between 4 and 30, more preferably 10 to 20, a type of wire being solid or stranded wire cable with a plurality of strands, the wire or wire cable having a gage selected from AWG1 to AWG20, more preferably AWG4 to AWG12, with preferably Litz wire being used as the type of wire; the outside diameter of the coil being selected from 10 cm to 50 cm, more preferably from 12 cm to 30 cm and the inside diameter of the coil being selected from 2 cm to 30 cm, more preferably 4 cm to 20 cm.

In one example, by switching a switch, such as a solid state relay or mechanical/electrical relay, a different resonance frequency may be selected from a plurality of resonance frequencies for the same coil, such switching from a first resonance frequency selected in a range from 5 kHz to 100 kHz, more preferably 10 kHz to 60 kHz; and a second resonance frequency selected in a range from 80 kHz to 1 MHz, more preferably 100 kHz to 500 kHz. In the example illustrated in FIG. 4, a control circuit may provide for control of the voltage across the transmission coil, which may be selected from a plurality of input voltages, such as voltages from 3.3 VDC to 48 VDC or 110 VAC to 250 VAC, more preferably 3.3 VDC to 5 VDC, 5 VDC to 12 VDC, 12 VDC to 24 VDC, 24 VDC to 48 VDC, 115 VAC to 124 VAC, or 230 VAC to 250 VAC.

Figure 4:
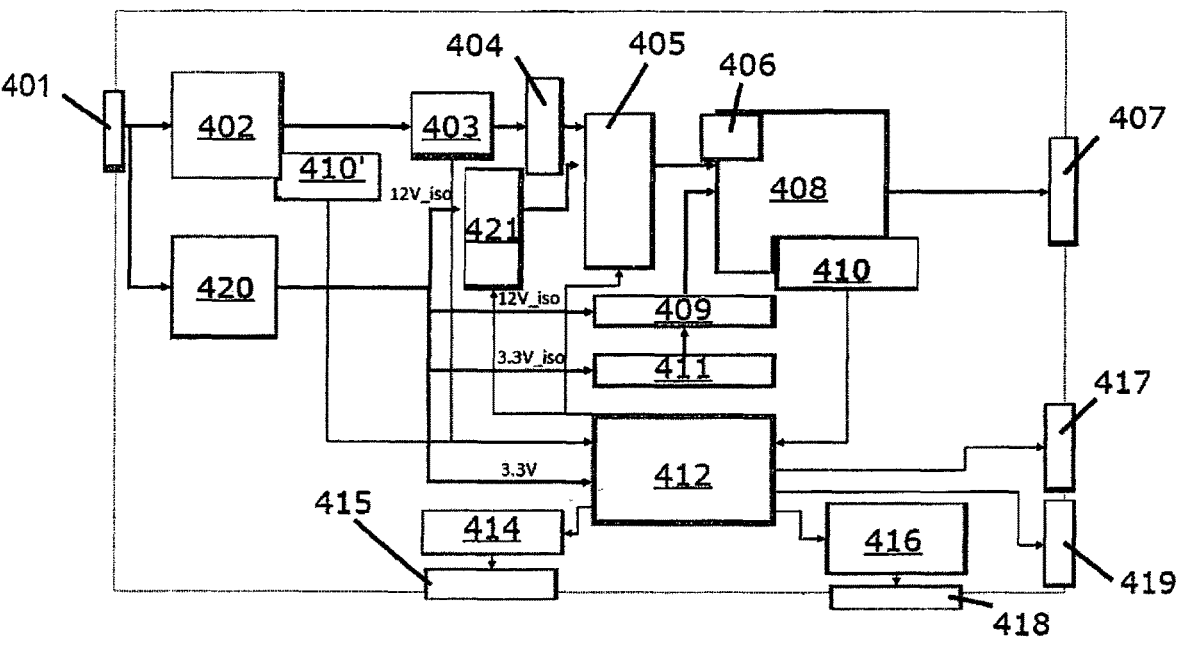
FIG. 4 illustrates an example of a control circuit for controlling a voltage across a coil.

For example, a hybrid power transmission device may comprise both a voltage regulation control circuit, such as illustrated in the example of FIG. 4, and a resonance frequency switching circuit. These circuits may be separate or combined into a single circuit board. In this example, both the voltage and resonance frequency may be selected for a particular receiving device or devices, such as a pan, a battery operated device that requires charging, or a kitchen appliance, such as a battery-free appliance. In one example, a kitchen appliance may have a low power mode and a higher power mode using a single coil with at least two resonance frequencies that are switchable. The low power mode may be for powering on the kitchen appliance with a power consumption from 1 to 100 Watts, and in this mode the kitchen appliance may communicate with a communications circuit in a transmission coil hub. In one example, a low power mode is less than 10 Watts, a medium power mode is from 10 Watts to 100 Watts, and a high power mode is for power requirements greater than 100 Watts, such as from 100 Watts to 5000 Watts, more preferably 100 Watts to 1500 Watts. If the maximum power is limited, then any authorized appliance may be limited to the maximum power limit of the hybrid power transmission device (also referred to as "Hub").

The schematic example of FIG. 4 illustrates a voltage management circuit for use in a power transmission device. Alternating Current (AC) power input to the device is filtered by an AC filter printed circuit board 401, for example. In the example of FIG. 4, the voltage control circuit may use AC current, transmitted through a four diode bridge 402, current sensor 403 and line capacitor 404, as input to power relay 405. Optionally, a temperature sensor 410' may measure the temperature of the four diode bridge 402 to the micro control unit (MCU) 412. AC power may be converted to Direct Current (DC) via input to an AC/DC converter 420, which may be used to provide DC voltages of 12 Volts and 3.3 Volts, as illustrated in the example of FIG. 4. For example, 12 Volt power may be input to a 12 Volt power relay, which may feed 12 Volt DC into power relay 405 when the 12 Volt power relay is switched on. Voltage sensor 406 may detect the voltage output from the power relay 405, and the measured voltage may be used by the micro control unit (MCU) 412 to control the power management circuits relays and the like. A half bridge 408 may condition the power input to the half bridge such that the power output to power output connector 407 is the voltage and current needed for powering a power transmission coil, for example. Current and the temperature sensors 10 may provide signals for current and temperature monitoring to the MCU. Combining a gate driver 409 and an isolator 411 allows transfer between high-voltage and low-voltage units, while preventing hazardous or uncontrolled transient current flow. Isolation from transients may be realized by integrating the isolator together with the high-speed gate driver. Based on signals from temperature sensors, the MCU may provide a control signal to fan controller 414, which outputs power to one or more fans via fan connector 415. A resistance thermometer circuit 416 may be used for connecting a resistance thermometer to the MCU for controlling a resistance thermometer connected via the resistance thermometer connector 418. For example, a resistance thermometer may measure temperature accurately by the change in resistance through the thermometer as a function of temperature. In one example, a platinum 1000 resistance thermometer is used, which has a resistance of 1000 ohms at a temperature of 0° centigrade. A touchpad may be coupled to the MCU via touchpad connector 417, and other devices and sensors may be connected via another connector 419, for example. Thus, the voltage output and output power may be controlled via the MCU of the voltage control circuit.

In one example, a power transmission hub (Hub) may comprise a plurality of transmission coils for use simultaneously, such as two transmission coils, three transmission coils, four transmission coils, or even more; however, each transmission coil is a single transmission coil (not a dual transmission coil with two different coils). Each single transmission coil may operate at a plurality of selectable resonance frequencies by switching between resonance frequencies. This is fundamentally different than adjusting a single resonant frequency between in phase and out of phase to control the level of power output of the transmission coil. Instead, switching between a plurality of resonance frequencies of a single coil provides for a completely different resonance frequency for powering a particular device selected from a plurality of devices that may be powered by the single transmission coil. For example, the single transmission coil may inductively heat a pan, recharge a cellphone, or operate an appliance, such as a blender, microwave, toaster oven, or any other appliance. None of these devices need to be plugged in to a wall outlet. The Hub may be separated by a distance from the appliance. Yet, the Hub may provide all of the power needed by the appliance. In one example, all of the energy for operating all of the devices may come from a single transmission coil. In this way, a single transmission coil may be operated to provide optimized, efficient power to a wide variety of device types including inductive heating of pans and comparatively high and lower power appliances and devices.

In one example, kitchen appliances powered by a hybrid wireless power device may have a lower power mode for operating lower power electronics, such as a display and controls, and a higher power mode for powering higher power components of the kitchen appliance, such as heating coils, microwave generators and electric motors, for example. For example, a single power transmission coil may power both the lower power mode and the higher power mode, the higher power mode being powered at a first resonance frequency and the lower power mode being powered at a second resonance frequency, wherein the second resonance frequency may be greater than the first resonance frequency of the single coil. In one example, three resonance frequencies are identified for a single transmission coil.

In one method, a hybrid power transmission device may detect presence of a device within a predetermined operating distance of one of its power transmission coils. The device may be detected by a sensor. In one example, the sensor is a current and/or voltage sensor that determines the presence of a load when a device is disposed near the power transmission coil, and the power transmission coil is activated at a resonance frequency. For example, the transmission coil may be activated at a power and frequency that would induce a response in a receiving coil of a device that may be detected by measuring a voltage and/or current of the power transmission coil. Alternatively, or in addition to, the measurement of a voltage and/or current within the power transmission coil, a signal may be sent from a device receiving power to the hybrid wireless power device that is transmitting power to the device. The power transmitted may be sufficient to power a circuit of the receiving device such that the receiving device is capable of communicating with the power transmitting device, for example. In one example, communication may comprise a unique device identifier, and the unique device identifier may be encrypted or transmitted in a secure way verifies the identity of the device receiving power.

In one example, a power transmitting device or Hub may comprise a database of identifiers permitting the Hub to verify that a power receiving device is an authorized device. The database may comprise information correlated to the identifier that specifies the type of device and parameters necessary for the power transmission device to transmit power efficiently to the receiving device and/or other parameters for managing the transmission and communications with the receiving device. In one example, signals from the receiving device are received on the same coil as the power transmission coil. For example, multiplexers may transmit and receive signals between the power receiving coil of a device and the power transmission coil of a hybrid wireless power transmitting device.

Figure 6:
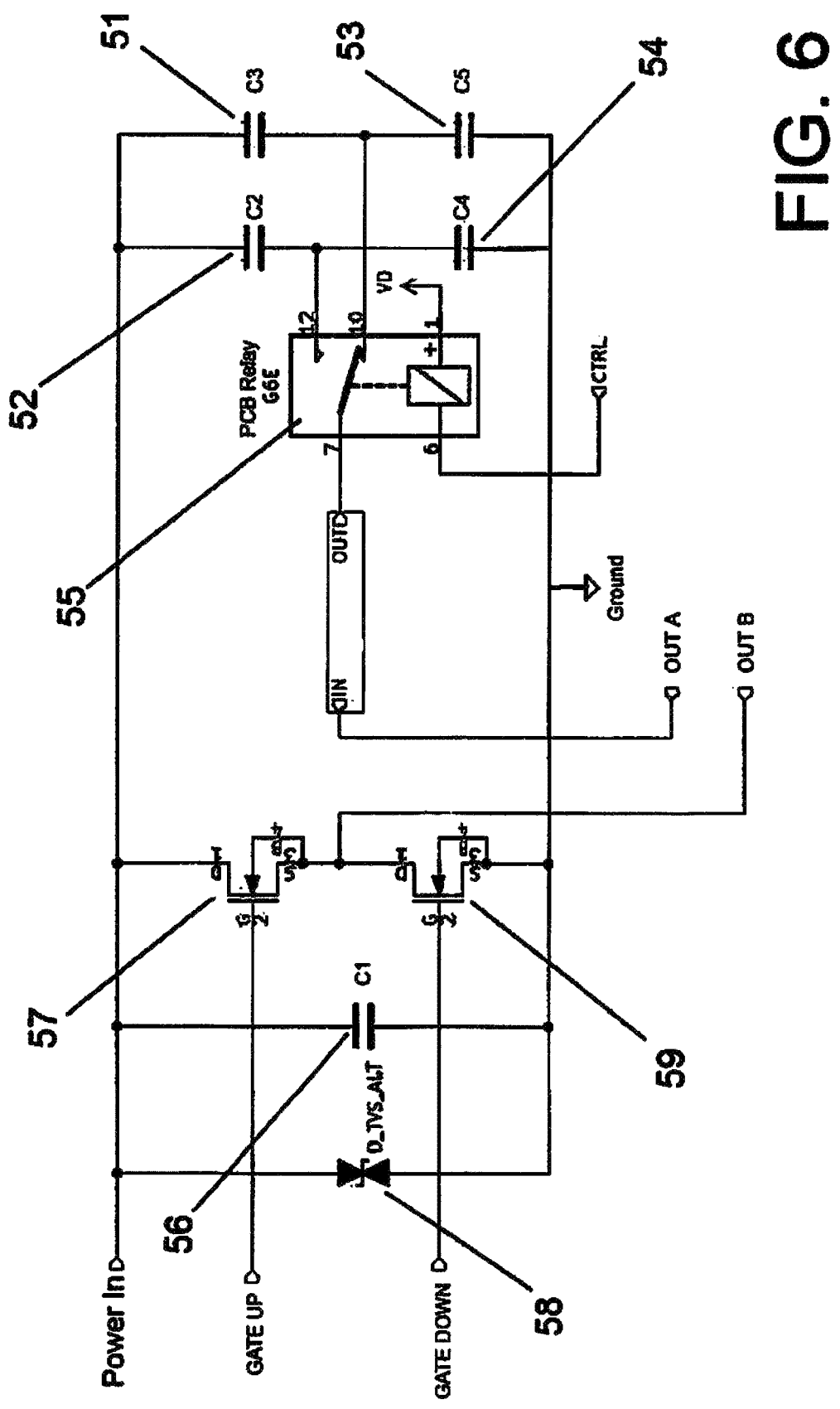
FIG. 6 illustrates an example of a switchable resonant circuit having a plurality of resonance frequencies.
Figure 7:
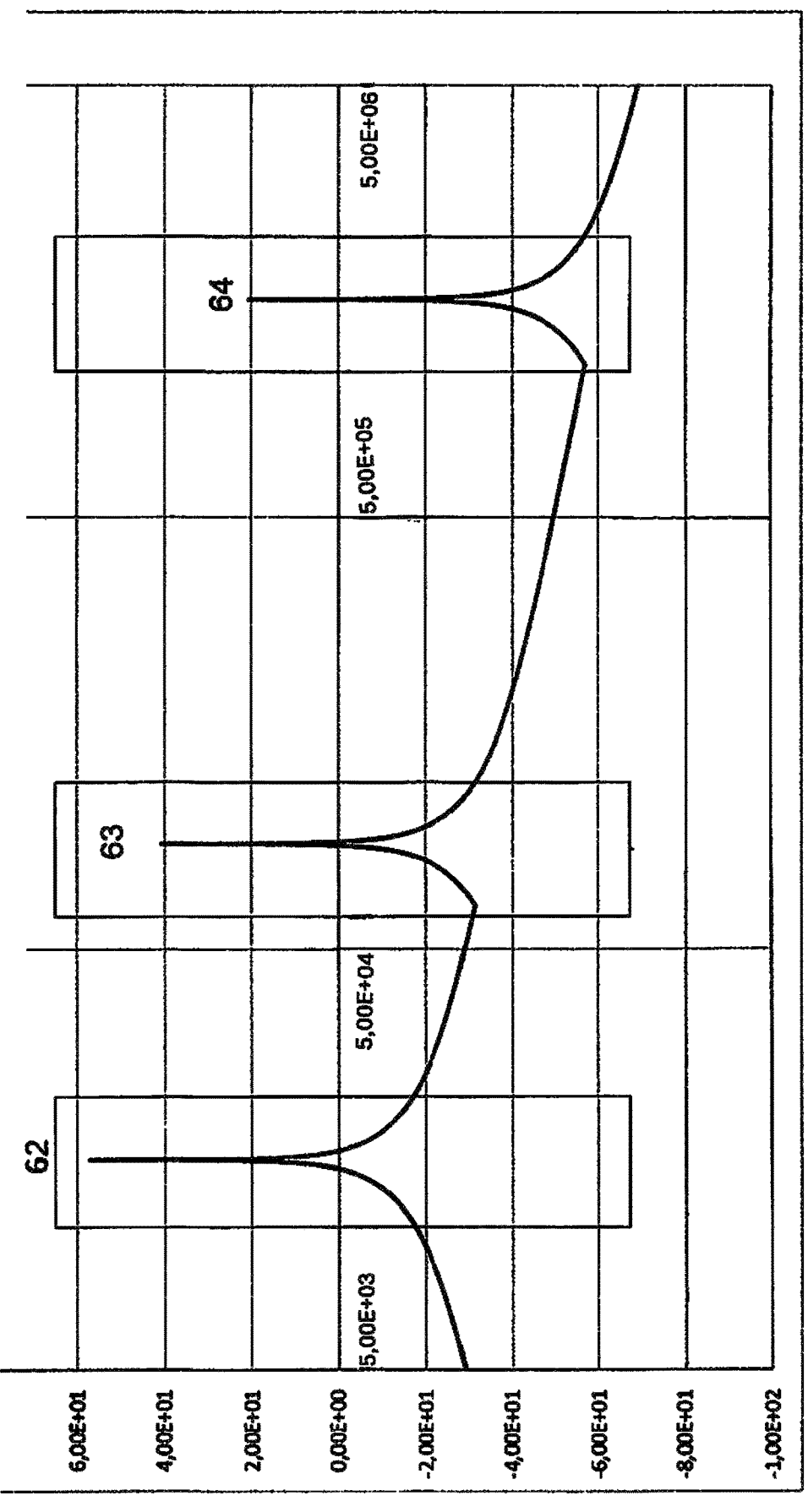
FIG. 7 illustrates an example of graph of intensity versus frequency for a single coil having a plurality of selectable resonance frequencies.

In one example, a resonant circuit comprises electronics that induce a resonance frequency by applying a voltage/current to a transmission coil. A resonant circuit may comprise a half bridge circuit, for example. As illustrated in the example of FIG. 6, a resonant circuit may use a switch 55, such as a solid state relay or electro-mechanical relay, to switch between optional capacitor configurations that switch between a plurality of resonance frequencies, such as from a first resonant frequency to a second resonant frequency for a single coil. For example, a G6E PCB Relay may be used to switch between two different sets of capacitors. Capacitors 51-54 may be selected for energizing a power transmission coil (not shown) at a predetermined resonance frequency or frequencies of the coil. The switch 55 may select between a plurality of capacitors that function to power a coil at a plurality of resonance frequencies of the coil. For example, in a first state the switch may select a first pair of capacitors 52, 54 and in a second state the switch may select a second pair of capacitors 51, 53. For example, as illustrated in the example of FIG. 6, the first pair of capacitors may operate the coil at a first resonance frequency 62, and the second pair of capacitors may operate the coil at a second resonance frequency 63, as illustrated in the example of FIG. 7. The third resonance frequency 64 in FIG. 7 is a parasitic capacitance of the coil, itself, for example.

The resonant circuit may utilize a pair of transistors 57, 59 as illustrated in FIG. 6 and may comprise a capacitor 56 in parallel with a transient voltage suppressor 58 to manage transient current spikes, as is known in the art. For example, the transient voltage suppressor may comprise a transient voltage suppressor (TVS) diode.

By selecting the resonance frequency in the coil from a plurality of resonance frequencies of the coil, a single power transmission coil may be used to power a plurality of receiver coils, the plurality of receiver coils being selected such that one or more resonance frequencies of the transmission coil are coupled to one or more of the resonance frequencies of the receiving coil.

Figure 3:
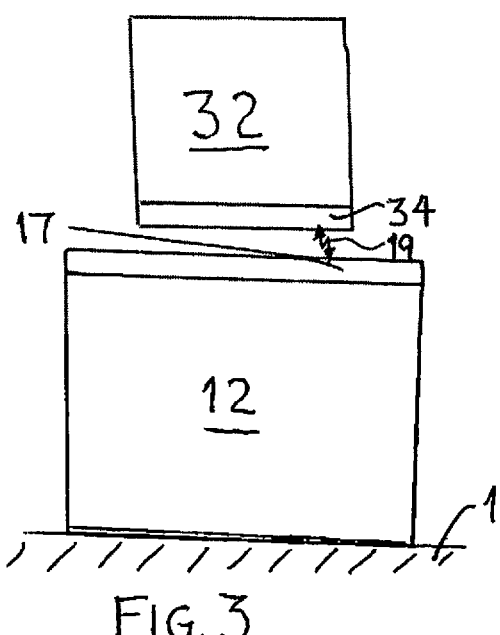
FIG. 3 schematically illustrates an example of a hybrid wireless power device and a receiving device disposed above the hybrid wireless power device.

For example, a power transmission coil, as illustrated in the example of FIG. 3, may be selected with a predetermined number of wire turns, wire gage, wire type and length of wire to efficiently transfer energy at the predetermined resonant frequency. In one example, the type of wire in the coil may be a multistrand wire or cable designed to reduce skin and proximity effect losses. The wire for the coil may comprise many thin wire strands, individually insulated and twisted or woven together. Wires may be twisted together into wire bundles that are twisted together to form wire cables, for example. For example, the winding pattern may be selected to equalize the proportion of the overall length over which each strand is at the outside of the conductor, which has the effect of distributing current equally among all of the wire strand conductors and reducing resistance of the coil. For example, Litz wire may be used.

For example, when the hybrid power transmitter is coupled wirelessly with an appliance by placing the appliance on the surface of the hybrid power transmitter. A coil of the transmitter may be activated at a low power, initially, and if an approved appliance is detected based on initial communications with the appliance, then the transmitter may power the appliance at a low power to turn the appliance on and to further communicate with the appliance. In one example, a sensor or sensors may be used to detect the presence of an appliance, device and/or pan. Alternatively, the transmission coil, itself, may be used to detect the presence of an appliance, device and/or pan. In yet another alternative, both a sensor or sensors and the transmission coil, itself, may be used for detecting the presence of an appliance, device and/or pan.

An appliance may receive enough power to share its identifying information, control information, or a combination of these at a very low power, less than 10 Watts, for example. For example, identifying information from an appliance may be encrypted or partially encrypted, using any encryption algorithm now known or devised in the future, to validate that the appliance is a licensed appliance that is safe to use with the transmitter, for example, before powering on the appliance. In this way, only approved and safe appliances may be powered by a transmission coil. In one example, a light emitting diode (LED) or diodes (LEDs) illuminate a location of the single transmission coil that will be used to power the appliance, and/or a user may be instructed to move the appliance to center of the portion of the hubs surface that is illuminated by the LED or LEDs to better couple the appliance to the transmission coil prior to providing high power to the appliance. For example, the LEDs may be organic LEDs (OLEDs). OLEDs may be provided in a panel that is protected by a transparent or translucent layer that is resistant to heat and abrasion. For example, the protective surface may be made of a chemically strengthened alkali-aluminosilicate or a ceramic, such as a polycrystalline, transparent ceramic material. This surface may be as thin or thick as needed to protect a display and/or transmission coils and controls disposed below the surface. Preferably, the protective surface and any display are as thin as required to provide the required protection. An insulating space and/or material may be provided between a protective surface and the OLED display, for example.

In one example, the display of a hub may be arranged to provide a display that may be programmed to show controls, instructions and the like, as well as recipes and other information under the control of a computer, for example, while a protective surface may protect the OLED display from scratches and heat. In one example, the OLED display matches a countertop colors/pattern to blend the transmission hub into the countertop, while the Hub is not being used. Alternatively, the OLED display may be programmed to contrast with the surrounding countertop. For example, the OLED display may change from one of camouflaging the hub to displaying the hub based on sensors, such as proximity sensor, capacitive sensors, pressure sensors or the like. A pressure sensor or sensors may be arranged in the hub to detect when pressure is applied to the surface of the hub. A capacitive touch sensor may determine when a person touches the surface of the hub. A proximity sensor may detect movement or the presence of a person in a position adjacent to the hub. One or a combination of these sensors may be used to alert the hub of the presence of a person seeking to use the hub, and the hub may change the appearance of the surface of the hub based on this presence.

Likewise, the user of a pan to be heated by inductive heating may be instructed to move the pan to an illuminated surface to better couple the pan to the transmission coil. In this way, it is easy to instruct a user to center a device on a coil, intuitively, because it is intuitive to center a pan or device on an illuminated circle. In addition to the LEDs, a voice or other indicators may be used to instruct the user to move a device and/or pan to better align the device or pan on the surface. In this way, a plurality of overlapping coils may not be required to power a variety of devices.

In one example, control information may be transmitted to a hybrid power transmitter hub by an appliance during an initial communications mode or handshake mode. Any information necessary to safely transmit power to the appliance, such as type of appliance, voltage, resonance frequency, power, other operating parameters, error messages, or combinations of these may be transmitted from the appliance to the hub or may be obtained by the hub based on a locally stored database or a remote database, as illustrated in the schematic of FIG. 3, for example.

For example, a remote database may be a centralized or distributed database, such as data stored in the 'cloud'. Herein, the 'cloud' refers to information stored in a network accessible database via the Internet. Any authorized device, such as a hybrid power transmission hub, may access the cloud to obtain information necessary for authenticating an authorized device and operating an authorized device. Likewise, any authorized appliance and/or hub may be wirelessly coupled to the cloud for updating bios, firmware and/or software of the appliance and/or hub.

In one example, a paid up license may be required for a device and/or hub to be authorized to access the cloud. In one example, a third party distributor of devices may be provided access to the cloud to support its licensed, authorized devices, allowing such authorized third party devices to be powered by a hybrid power transmission hub, whether distributed by the third party or another manufacturer or distributor. For example, communication with the third party and/or its devices may be accomplished using an application programming interface (API). The use and development of an API is well known in the art.

Examples of wireless data communications that may be incorporated into a transmitter hub and/or a receiver side of a device include components for multiplexing data carried on an electromagnetic field generated by the single transmission coil or by the receiving devices receiver side coil; radio frequency identification (RFID) using RFIP antennas separate from the power transmission coils, Bluetooth chip sets, Near-field Communications (NFC) chip sets, WiFi chip sets, WiMax chip sets, wireless USB chip sets, and other wireless communications capabilities that are known now or may come into existence in the future. In one example, multiple protocols are provided for communicating with a variety of devices and appliances.

Figure 5:
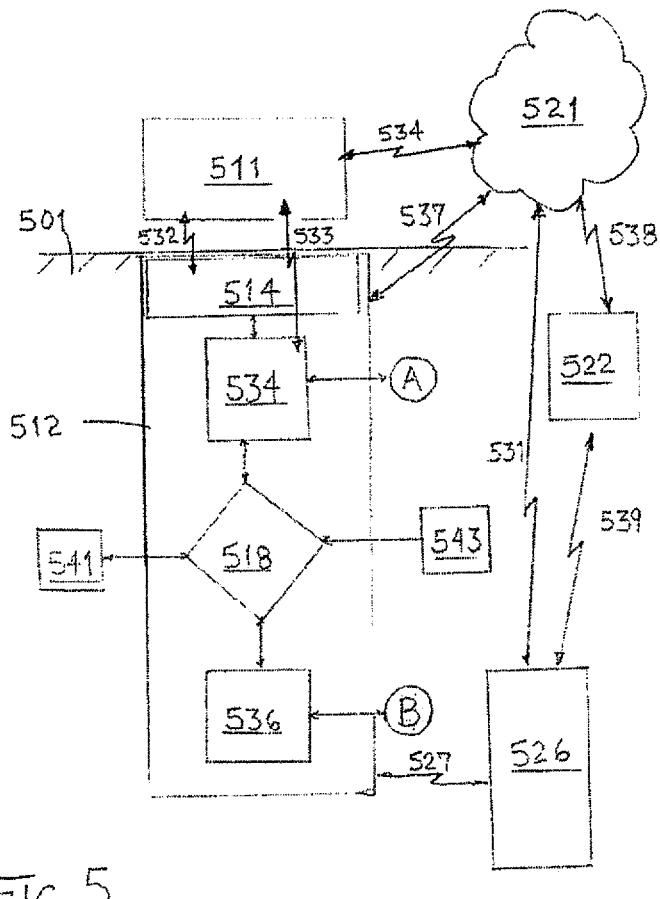
FIG. 5 schematically illustrates an example of communications for a hybrid wireless power device embedded in a countertop and in communication with a receiving device, a mobile device, sensors and a cloud server.

In one example, as illustrated in the schematic of a hybrid power transmission device 512 in FIG. 5, a micro-controller unit (MCU) 534 of the power transmitter may be connected to the Internet via WIFI, to an appliance via Bluetooth, and/or to a second hybrid power transmission device by wireless USB, for example. While a single coil 514 may provide power to a plurality of receivers, such as for heating a pan, charging the battery of a battery operated device, and operating a non-battery operated device, for example, communications from and to the hybrid power transmission device are not limited to the power transmission coil. In one example, the single coil uses multiplexing to encode a communications signal between the single coil of the transmission device and a receiving coil of a receiving device. In an alternative example, communications are accomplished using a separate communications device, such as a wireless communications antenna. For example, software, firmware or a bios of a micro-controller unit 534 may be updated from time to time by communicating with a server 521 that is coupled via a wired or wireless connection 537. For example, the server 521 may be a cloud server. For example, a wireless connection may be achieved using a WIFI router, an ethernet router, or a combination of these that interfaces to the Internet. In this way, the Internet may couple the hybrid power transmission device to the server.

In one example, the server 521 may be a virtual server located in the cloud, such as an AWS virtual server or the like. The server 521 may update software, firmware or a BIOS of the transmitter micro-controller unit 534, for example. Communications between the MCU 534 and other devices may be facilitated using the server 521. For example, an external device 522 may communicate with the server 521, and these communications may be relayed to the MCU 534 of the power transmitter. The MCU 534 operates the single coil 514 and may selectively activate the single coil 514 at one of a plurality of resonant frequencies. The external device 522 may be a third party server, such as a server of a manufacturer of a compatible licensed device 511 that is capable of receiving power from the single coil 514 of the power transmitter 512.

In one method, the single coil 514 is a power transmission coil that is capable of operating at a plurality of resonance frequencies. For example, a first resonant frequency may be selectable by switching a solid state relay that selects a first set of capacitors that establish a first resonance frequency of the single coil. The MCU 534 may poll the single coil 514 periodically, for example, allowing the MCU 534 to detect if a device capable of coupling with the single coil is present nearby the single coil. Specifically, if a pan made with a suitable material is nearby, then the MCU can detect the presence of the pan from measurements of voltage and current of the single coil. The MCU may use a comparator logic circuit 518, which may be coupled to a plurality of sensors 541, 543, to determine whether a device compatible with the power transmitter 512 is nearby. For example, the sensors may include current, voltage, impedance, pressure, temperature and combinations of these. Data from any number of sensors may be analyzed by the comparator logic circuit 518 to affect the way that an MCU operates the single coil. For example, if an appliance is disposed nearby a coil, the comparator logic circuit may determine the presence of the appliance using one or more of the sensors. Then, the MCU may operate the single coil at a resonance frequency capable of powering on communications and/or control circuitry of the appliance.

Figure 2:
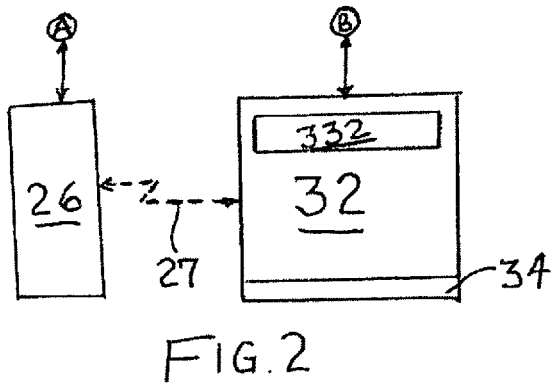
FIG. 2 schematically illustrates an example of a receiving device.

In one example, the comparator logic circuit may use a separate communications circuit 536 to facilitate communications between the power transmitter 512 and the device 32, as illustrated in FIG. 2. Alternatively, the power transmitter may communicate (circle A) with a mobile device 26, such as a cellular smartphone or tablet, which establishes wireless communications 27 with the power receiving device 32, such as an appliance. In one example, the mobile device 26 may communicate directly with the power transmission device 512 (circle B) and the power receiving device 32. Alternatively, as illustrated in FIG. 5, in an alternative example, a mobile device 526 may communicate 527 with the power transmission device 512 or may communicate 531 with one of a plurality of servers 521 that relay communication 534 to a power receiving device 511. For example, the mobile devices 26, 526 may operate an application, providing a user interface that controls a plurality of power receiving devices 32, 511. In this way, a plurality of user interfaces may be provided for respective power receiving devices on a user's mobile device, for example. In one example, a receiving device 32, such as an appliance, may comprise an interactive display 332 that is powered at a comparatively low power that is less than the power needed to operate the entire device 32. For example, the device 32 may comprise a motor, a microwave generator, or a heating element. Herein, 'a' means 'one or more', and may comprise motors, generators or elements. Herein, 'plurality' means 'two or more'. The motors, generators and elements may require greater power than the power needed by a receiving device to communicate with the power transmission device and/or to operate the receiving device's controls.

In one example, a coffee machine 32 comprises a touch screen display 332. The coffee machine is placed in proximity to a countertop hybrid power transmission device 12, as illustrated in FIG. 3, for example. The countertop device 12 is not embedded in the countertop but sits atop the countertop and plugs into a wall outlet for powering the countertop device. The appliance 32 is a coffee machine in this example, and the countertop device 12 is a hybrid power transmission device, similar in every other way to the embedded device 512 in the example illustrated in FIG. 5 for example, except that the example in FIG. 5 is embedded in a countertop 501, while the countertop device 12 sits on the top of the surface 1 of a countertop.

In one method, when the coffee machine is placed on the countertop device, a pressure sensor 541 of the countertop device may detect the presence of a mass disposed on a working surface of the countertop device, and the comparator logic circuit 518, which may receive the signal from the sensor, may communicate with the MCU 534 and/or the communications circuit 536. The MCU may respond to the communication from the logic circuit 518 by operating the single coil 514 at a resonance frequency, which may be used to transmit power to the receiving coil 34 of the coffee machine 32.

In one example, the receiving coil 34 on the coffee machine 32 may receive power from the single coil 514, which may be used to power communications B between the coffee machine 32 and the countertop device, via the communications circuit 536, such as by a Bluetooth transmitter/receiver. The coffee machine may transmit an encrypted identifier via the communications circuit 536, which may be decrypted and compared with known identifiers by the comparator logic circuit, with or without communications with the MCU. For example, the MCU may comprise a list of paired identifiers that are authorized to be powered by the countertop device. This list may be provided to the comparator logic circuit or may be stored in an array within the comparator logic circuit for comparison with the decrypted identifier, for example. Once the identity of the coffee machine is confirmed, operating parameters of the coffee machine may be retrieved from the coffee machine 32, a database stored in the countertop device 12, from a third party website 522 and/or from a cloud server 521, for example. As illustrated in the example of FIG. 3, communications and power may be transmitted 19 between the single coil 17 of the countertop device and the receiving coil 34 of the coffee machine 32, for example. Alternatively, a separate communications circuit 536 may transmit and receive communications (circle B) between the power transmission device and the coffee machine. In yet another alternative, a mobile device 26 may provide a user interface to communicate 27 with the coffee machine 32 and communicates (circle A) with the power transmission device 512. If the operating parameters of the coffee machine require greater power than is offered at a first resonance frequency, the MCU may use a solid state relay to switch the resonance frequency to a second resonance frequency of the single coil 17, 514, for example.

Updates on device identifiers and encryption algorithms may be updated by communications between a server 521 and a power transmission device 512, for example. In one example, wireless communications may provide access to cloud-based utilities, servers, or the like that can permit communications with licensed third party manufacturers, and these manufacturers may be provided access to communicate with a device on the transmitter side, the receiver side or both the transmitter and receiver sides for updates. As illustrated in FIG. 5, this may be accomplished using a third party server 522, using an application user interface (API). Communications circuits may resolve errors, provide user support, offer technical and/or diagnostic support, and may provide for other functionality.

For example, a higher power may be selected by switching to a lower resonance frequency, as illustrated in the example power transfer versus frequency graph in FIG. 7. As illustrated in the example of FIG. 7, the first peak 62 corresponds to a first resonance frequency at about 15 kilohertz, which reach a power of 2200 (Watts) at a working frequency of 19 kHz with a 20 cm diameter pot with water inside it. The second peak 63 corresponds to a second resonance frequency peak at 150 kilohertz, which has a peak power of 30 (Watts) at a working frequency of 180 kHz with the same load. The third peak 64 corresponds to the coils resonance frequency due to parasitic capacitance at about 1.2 megahertz and 5 Watts. Using the same load For example, if a circuit illustrated in FIG. 6 is used to switch between the first resonance frequency 62 and the second resonance frequency 63, the following components may be used in the circuit: A power conditioning capacitor 56 of 470 nanofarads; a first resonance capacitor 51 and second resonance capacitor 53 having a capacitance of 330 nanofarads and 330 nanofarads, respectively; a third resonance capacitor 52 and a fourth resonance capacitor 54 having a capacitance of 4.7 nanofarads and 4.7 nanofarads, respectively. The coil selected for this example may have the following characteristics: outer diameter of 15 cm, inner diameter of 5 cm, 15 turns and 2 layers using Litz wire with an inductance of around 300 microhenry and 0.5 Ohms at 20 kilohertz. In one example, the resonance frequency is selected at a frequency other than the frequency corresponding to the peak power. Instead, a frequency is selected near to the resonance frequency at peak power, because at peak power the impedance of the coil would be too low and the induced current too high to be managed properly by the circuit. Choosing a capacitance that selects a frequency close to the resonance frequency at peak power increases impedance and reduces induced current in the coil providing. For example, a frequency is selected that is greater than the resonance frequency at peak power. It is within the skill of a skilled artisan to adjust the selected frequency of the coil to provide a 'soft' switching condition that reduces losses and makes the electronic circuit easier to design and the system easier to control.

In one example, a smart IoT module may be integrated with a hybrid wireless power device. For example, a smart IoT module may collect and/or store data relating to power transmitted or received, time, current, voltage, frequency, temperature data and combinations of these. The data may be transferred from the device to the cloud, such as via a wireless connection from the device, such as an appliance, to a WIFI router that connects to the Internet. Alternatively, the device may communicate with a hybrid power transmission device via its single power transmission coil using multiplexing between the power receiving coil and the power transmitting coil or via a separate communications circuit, such a Bluetooth, NFC, wireless USB, WIFI, or any other wireless communication device and protocol.

In the example of FIG. 5, power may be transmitted 532 from the power transmission coil 514 to the receiving device 511, while communications 533 between the receiving device and the power transmission device are managed by the MCU 534 of the power transmission device 512. Alternatively or as a redundancy, for example, the power receiving device 511 may communicate with a server 521, and the server 521 may communicate with the power transmission device 512. In one example, the power transmission device 512 may be coupled to a modem via multiplexing of data communications with a modem via the power line to the power transmission device, and the modem may be coupled with the Internet via an Internet service provider. Alternatively or in addition, the power transmission device 512 may be coupled via WIFI router, ethernet connection or other data connections to the server 521.

In the example schematically illustrated in FIG. 2, the power receiving device 32, such as the coffee machine in a previous example, may be coupled with a user's electronic device 26 that provides a user interface for controlling the device 32, while controls 332, such as touch screen display, provides another way to control operation of the device 32. For example, a power transmission device 12, 512 may be either a countertop device or a device embedded in a countertop, respectively. In one method, the power transmission device operates at a lower power and higher frequency, initially, to determine if a power receiving device is located nearby. For example, the power receiving device may be a pan, which is detected by characteristics of the current and/or voltage detected in the power transmission coil 17, 514. In one example, sensors 541, 543 and/or a communications circuit 536 coupled with a communications circuit of the power receiving device may be used to determine characteristics of the power receiving device that help the MCU 534 select a preferred operating resonance frequency of the power receiving device, and the MCU 534 may operate at the initial resonance frequency or may switch to a second resonance frequency. For example, the initial resonance frequency may have a higher frequency at a lower power, and the MCU 534 may switch the frequency to a second frequency at a lower frequency and a higher power. For example, the MCU 534 may switch the power to higher power based on communications (circle B) between the power receiving device 32 and the power transmission device 12, 512. For example, a communications circuit 536 of a power transmission device 12, 512 may receive a request and/or signal that indicates the need to switch to a second frequency. Then, the MCU 534 of the power transmission device may utilize a switch, such as the example of a switch illustrated in FIG. 6, to switch between the initial frequency and the second frequency. While operating at the initial frequency, the power receiving device may have sufficient power to communicate with the power transmission device, to operate controls of the power receiving device, to operate the device at a lower power, and combinations thereof. For example, if the power receiving device is a toaster operating without battery power, then the toaster may operate at lower heating rate until the power transmission device switches to a higher power. If the power receiving device is a juicer, the device may operate its motor at a lower power until the power transmission device switches to a higher power. Alternatively, a juicer may comprise a capacitor for energy storage, and the capacitor, in combination with power transmitted by the power transmission device, may allow the juicer to operate at a higher power, initially, while the power transmission device switches the frequency to a lower frequency and higher power, for example. For example, if the power receiving device is a coffee machine, a first function, such as coffee grinding, may be performed at a lower power, and a second function, such as heating water may be performed at a higher power after the power transmission device switches the resonance frequency to a higher power resonance frequency. For example, each of these examples may include verification of the power receiving device as an authorized power receiving by the power transmission device.

Data may be analyzed using cloud computing data analytics and the data analytics may be transferred to users wirelessly for viewing on mobile devices or to computers via the Internet or other network. For example, mobile device support may comprise a mobile application wirelessly connected to the cloud for data visualization and analysis. In one example, data from appliances may be sent to the hub, and the hub may collect, store and/or forward the data to the cloud. Alternatively, an appliance may have a communications circuit that permits the appliance to upload data to the cloud. There may be a plurality of hubs, each with a plurality of power transmission coils, and a plurality of devices and appliances authorized to operate with each of the hubs. In one example, any appliance may be powered by any of the transmission coils on any hub. In an alternative example, a specific device may be directed to a specific coil on a specific hub. For example, LEDs may illuminate the location of the transmission coil for positioning of a specific appliance on one of the power transmission coils.

In one example, every power transmission coil of a Hub may power any authorized device. A Hub may operate not only to power the device but also may serve as the user interface for devices. A power transmission coil of a Hub may use multiplexing to collect data from signals encoded by devices and transmitted by a receiving coil of a device to the power transmission coil of the Hub, for example. In this way, the power transmission coil may be used simultaneously for receiving data from a device. Likewise, information may be transmitted from the power transmission coil of a Hub to the power receiving coil of a device. Alternatively, a separate communications antenna or antennas, such as radio frequency transmitters/receivers, may be used for transmitting and receiving data between a device and the Hub.

In one example, each hub and/or device may have a plurality of sensors. For example, sensors may include power consumption meters, volt meters, pressure sensors, vibration sensors, accelerometers, temperature sensors, timers for operating and idle states, and timers for each type of device powered, error codes, troubleshooting codes, and the like. Smart appliances may comprise their own set of sensors and data from the appliance sensors may be shared with the Hub and beyond, such as by providing data to a database in the cloud. Appliance sensors may comprise current measurement, power measurement, voltage measurement, pressure, temperature, vibration, accelerometers, and the like. This data may be correlated with the identifier for a specific device, such as by use of a blockchain or encrypted identifier and/or with make and model, date and time. By analyzing the data, a power transmitter may adapt to a particular smart device to more efficiently control and power the device.

In one example, an appliance may comprise a toaster oven, which may be powered inductively by one or more power transmission coils of a hybrid power transmission device (Hub). A power transmission coil may be coupled to a power reception coil in the toaster oven. The toaster oven may comprise a temperature sensor or sensors and may communicate temperature within the toaster oven to the Hub. The Hub may have more than one power transmission coil, each of the power transmission coils may be switchable between a first resonance frequency and a second resonance frequency. A smaller toaster oven may operate with a single power receiving coil, while a larger toaster oven may operate using a plurality of power receiving coils, each of the power receiving coils being paired with one of the power transmission coils of the Hub. For example, the Hub may analyze the temperature signals or measurements to determine the rate of heating, type of heating and time for the temperature to be ramped and/or reduced and/or turned off.

In another example, a blender may have a speed sensor, vibration sensor and/or accelerometer. Each of these sensors may communicate data to the Hub, and the Hub may determine if there is a condition that requires higher power, a condition requiring powering off the blender, a condition that requires a notice for recommended blade sharpening or replacement, a condition requiring adjustment of the blade speed for the type of blending or type of food being blending, and the like. Alternatively, the blender may determine these conditions from the sensors and may communicate with the Hub by transmitting condition codes or the like. In one alternative, the sensors in the device may be combined with sensors in the Hub to determine conditions or error codes to be displayed to a user or an external third party, such as a company that automatically replaces a filter, blades or the like. In one example, a new sensor may be integrated into an appliance, and the Hub may recognize the data is from a new sensor and may update its software, firmware or bios to accommodate a new sensor and/or a new appliance.

In one example, a Hub used near field communications (NFC) or a type of radio frequency identification for automatically detecting and communicating with an appliance positioned within range of the Hub. The appliance may receive low power from the Hub. By low power, herein, it is meant power sufficient to energize a communications circuit of an appliance and transfer information to the Hub but not sufficient for operating an electric motor or heating element of the appliance. For example, NFC communications automatically may detect the appliance and may be used to verify that the appliance is an authorized appliance, determine the type of appliance, determine the power required to operate the appliance user interface, and the power for operating the appliance for its specific function.

In one example, a toaster oven provides temperature data to a Hub, and the Hub uses the temperature data to provide power to the toaster elements for ramping temperature, reducing temperature and/or otherwise controlling the heating of the toaster elements based on heat capacity of the food in the toaster oven. In another example, a blender provides data on torque, temperature, speed selected, current, vibrations and/or accelerometer data, and the Hub analyzes the data to determine the power to deliver to the blender and/or error and maintenance conditions for the blender. For example, if the blender tips over, the data from an accelerometer could alert the Hub to power down the blender, whether or not the blender shuts itself down.

In one example, the Hub may provide for voice control of appliances, wherein the Hub comprises a microphone and a voice control circuit. The microphone and/or voice control circuit may be part of the Hub or may be external to the Hub, and the voice control circuit may perform voice analysis for controlling an appliance wirelessly coupled to the Hub, such as by NFC, Bluetooth, WiFi or the like. For example, the Hub may be in communication with a third party voice recognition device, such as a voice recognition device on a mobile telephone coupled wirelessly to the Hub, an cloud-based voice service platform that powers an entire smart device ecosystem coupled via the Internet to the Hub, or any other artificial intelligence voice service platform. Any of these examples may be used as a voice controlled user interface for devices powered by the Hub.

In one example, a timer may delay the operation of an appliance until a time in the future that is selected by a user, such as by the user speaking to the Hub or an external device. In one example, the Hub communicates with a third party device, such as a cloud-based voice service, such as Alexa, a trademarked service of Amazon available on more than 100 million devices from Amazon and third-party device manufacturers. For example, the Hub may receive information from a third party service that may be used to operate an appliance, such as by voice commands. In one example, the voice commands are natural language commands. For example, the Hub may comprise an artificial intelligence learning system that learns natural language commands of a user over time. For example, a cognitive system may achieve these abilities by combining various aspects of artificial intelligence, natural language processing, dynamic learning, and hypothesis generation as disclosed in U.S. Pat. No. 10,445,656 or a concierge device that can be configured to register, control and support an appliance as disclosed in U.S. Pat. No. 9,614,964.

In one example, a power transmission Hub is permanently connected to power, such as household power, and remains active or on standby, waiting for cookware, a device or an appliance that requires power. For example, a power receiving device may have no source of power without coupling with an active power transmission coil. When not powered, an unpowered receiving device is dark. In one example, when an appliance is positioned near enough to a Hub, very low power source may be coupled to a transmitter on the appliance, which may be used to identify the appliance. This may be an RFID sensor or a resonant power coupling device that is capable of providing more power at a distance, such as electron branded wireless vehicle charging technology, Witricity branded wireless power transfer over distance technology, the wireless power transfer standard of Alliance for Wireless Power (A4WP), near-field wireless energy transfer technology developed by Fulton Innovation, a division of Alticor, which allows multiple receivers to be powered by a single coil simultaneously, Wireless Resonant Energy Link (WREL), a brand of wireless resonant energy transfer technology developed by Intel, or other wireless energy transfer at a distance technologies.

In one example, the same coil used for powering a device is used for communicating with the device via multiplexing or other form of encoding data within an electromagnetic field generated between two devices. Alternatively, power is transmitted by a transmission coil, while communications are coupled via radio transmitters and receivers separate from the power transmission coil. For example, a Hub 512 comprises a microcontroller unit (MCU) 534, and the MCU receives data from an unknown appliance 511. A comparator 518 of the Hub analyzes the data to confirm that the data is from an authorized appliance, and the MCU starts reading the data. The data may be sensor, user interface data, or a combination of these. In one example, the Hub or devices external to the Hub comprises sensors 541, 543 that transmit data to the Hub. The data may be sensor data such as pressure, temperature, vibration, or the like. In one example, data is transmitted to the cloud and/or forwarded to a user's mobile device 26, 526 that may be coupled to the cloud, and a unique identifier for the unknown appliance may be transmitted from the unknown appliance to the Hub, the mobile device or both thereof. Then, the user may control the appliance using an application user interface on the user's mobile device, for example. The user interface on the mobile device may be tailored to the specific appliance identifier, for example. Alternatively, the user's mobile device may be coupled directly with the Hub, the appliance, or both the Hub and the appliance. In one example, the cloud comprises a virtual server or a plurality of virtual server instances hosted on a server or servers, which may be third party servers. For example, if a Hub identifies an appliance based on its certificate or a unique identifier or both, then the Hub may provide additional power to power on the appliance, when the appliance is near enough to a power transmission coil to power on the appliance. The additional power may be used for powering up the controls and user interface for the appliance, for example, or may be used for operating the appliance. For example, the appliance may be operated with no battery for energy storage. An advantage of battery free operation is that batteries are limited to the number and depth of discharge and recharge cycles, requiring replacement of batteries, which can be costly. Battery free operation may extend the useful life of an appliance and reduce cost compared to appliances requiring substantial electric battery storage for operation.

In one example, each device that has a power receiving coil may be assigned a unique identifier, which may be encrypted using any of the known or later devised encryption technologies. The Hub verifies that the identifier of the appliance is an authorized identifier, and the Hub provides additional power to the appliance. Likewise, each user may be assigned a unique identifier, permitting the user to log into an application hosted on a mobile device, wearable or the like. Once the mobile device and the appliance are coupled, such as by linking the two, then the user may use the application to control the appliance. In one example, a plurality of devices of all types, including, without limitation, appliances, may be compatible with a plurality of Hubs and/or mobile apps and/or other devices. For example, an ice cream chiller may be powered by a Hub and may be compatible with a mixer and/or a blender powered by the same Hub, whether of the same brand or a different brand. For example, a database of identifiers may be certified for use with one or more other identifiers. Any Hub may retrieve identifier data from a device, verify the device is an authorized device and accept data from the device, in addition to powering up the device and transmitting wireless power to the device for operation of the device when the user indicates that the device is activated. If information about a device is not stored in a Hub, already, the Hub may access a remote database to verify an identifier of a device.

Examples of components that may be incorporated into a transmitter and/or receiver for communications include Bluetooth, Near-field Communications (NFC), WiFi, WiMax, wireless USB, and any other means of connecting to the Internet and/or a wireless cellular network. In addition, communications may be transmitted via the transmission coil and the receiving coil by multiplexing or otherwise. For example, time-division multiplexing may be used, such as statistical multiplexing, an asynchronous mode time-domain multiplexing which is a form of time-division multiplexing. Digital bit streams may be transferred over an analog channel by means of code-division multiplexing techniques, such as frequency-hopping spread spectrum and direct-sequence spread spectrum multiplexing. Multiplexing may use alternating polarization (horizontal/vertical or clockwise/counterclockwise) or phased multi-antenna array with a multiple-input multiple-output communications, or space-division multiplexing may be used with multiple antenna elements forming a phased array antenna, for example, such as multiple-input and multiple-output, single-input and multiple-output and multiple-input and single-output multiplexing. Any combination or variation of multiplexing may be used for communications. Any multiplexer-demultiplexer coupling may be used to transmit data at sufficient bit rates between a power transmission coil and a receiving coil or vice versa.

Figure 8:
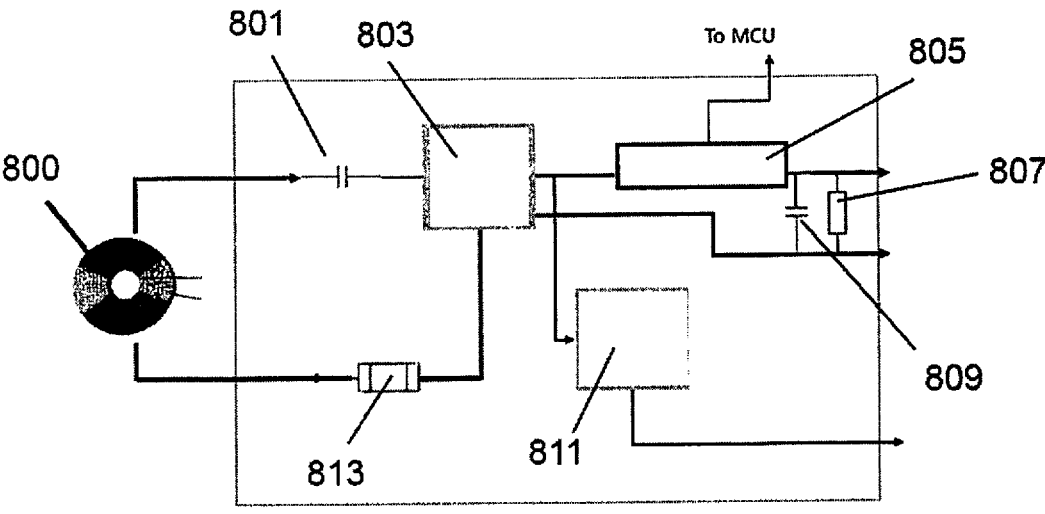
FIG. 8 illustrates an example of a power receiving circuit for an appliance.

In one example, a single-frequency receiving device, such as a coffee maker, blender or other kitchen appliance, may operate exclusively on power provided by a wireless power transmission device, such as those disclosed herein, without any battery. For example, FIG. 8 illustrates an example of a power control circuit for a power receiving device that contains a single coil 800 that operates at a selected frequency. In this example, a single coil of Litz wire for the receiving device has 10 centimeter outer diameter and a 3 centimeter inner diameter with 15 turns of the wire in a single layer. The coil may have an inductance of 100 microhenry and a resistance of 100 milli-Ohms at 20 kHz, for example. The power control circuit may comprise a resonance capacitor 801 having a capacitance of 470 nano-Farads and operating at 1.5 kiloWatts and 19 kiloHertz, for example, which may be nearly at a peak power resonance frequency of the coil. Preferably, the frequency is not exactly at the peak power resonance frequency of the coil but is operated at a frequency that optimizes power received by the coil and stability and reliability of the circuit. For example, a 4-diode bridge 803 is used for converting alternating current to direct current for use in powering a receiving device, such as an appliance. In one example, direct current is provided to a micro-controller unit of the receiving device at 3.3 Volts. A fuse 813 may be provided to protect against current spikes on the alternating current side of the circuit. Sensors 805, such as temperature, voltage and/or current sensors may provide the micro-controller unit of the device with data useful for controlling the power control circuit and operation of the device. An output resistor 807 and output capacitor 809 may be used to provide a stable output voltage and current for a load, such as a motor, heating element or microwave generator, for example. If the output voltage is a high voltage, such as 12 Volts, then a DC/DC converter 811 may be used to provide a lower voltage supply for operating the micro-controller unit and/or user interface of a device receiving power from the coil 800.

Figure 9:
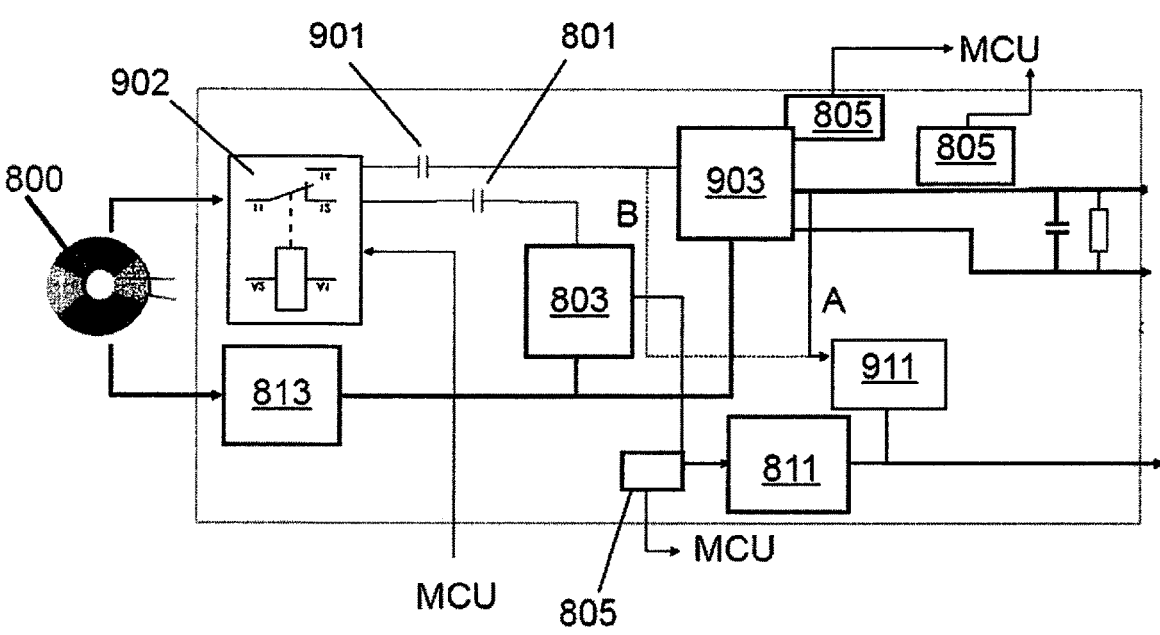
FIG. 9 illustrates another example of a power receiving circuit for an appliance.

In another example, a dual-frequency receiving device comprises the same single coil 800 as the single-frequency receiving device in the previous example, but the dual-frequency receiving device has a plurality of resonance frequencies. For example, a power control circuit of the dual-frequency receiving device is illustrated in FIG. 9. The circuit in this example is switchable between a high power resonance frequency using a capacitor of 470 nanoFarads, for example, or a low power resonance frequency using a capacitor of 6.8 nanoFarads, for example, using a switch 902, which may be controlled by the micro-controller unit (MCU) of the device. Sensors 805 of various types may be used for monitoring current, voltage, temperature and other variables important to control of the power control circuit. In this example, the coil 800 may receive 1.5 kiloWatts at 19 kiloHertz using a high power resonance capacitor 901 and 30 Watts at 180 kiloHertz using a low power resonance capacitor 801. The AC/DC converters 803, 903 may convert the alternating current to direct current. Optionally, alternating current or direct current may be fed to power converter 911 for supplying 3.3 Volt direct current to operate the MCU and/or other electronics requiring low power, such as a communications modules (as illustrated previously). If alternating current is supplied, option labeled B, then converter 911 is an AC/DC converter. If direct current is supplied, option labeled A, then converter 911 may be a DC/DC converter, such as 12 Volt DC to 3.3 Volt DC. A DC/DC converter 811 may be provided for the low power portion of the circuit, also, as needed. The output from the high power portion of the circuit shows a resistor and capacitor, as in the example of FIG. 8.

While the circuit of FIG. 9 is more complex, the benefit of operating at two different frequencies and two different power levels using a single coil is a significant advantage. One advantage is the operation of the device in a low power communications-only or communication plus user interface only mode.

In one example, the frequency selected in the receiving device may be selected at a frequency near the resonance frequency at peak power, and the frequency selected for the high power and low power circuits may be at a frequency different than the frequency of the power transmission coil supplying the power to the receiving device. By making the resonance frequencies selected for the receiving coil different than the resonance frequencies selected for the transmission coil, the power control circuit may be made simpler and more reliable than if the frequencies were selected for operating at peak power.

In one example, a resonance frequency in the transmission coil with an inductance of 300 micro-Henries, using a capacitance of 330 nanoFarads, may be 16 kHz, while the resonance frequency in receiving coil with an inductance of 100 micro-Henries, using a capacitance of 470 nanoFarads may be 23 kHz. This mismatch in resonance frequencies between the transmit and receive sides may be optimized to improve a coupling factor between the transmit and receive side, because the operating frequency of the transmit side is selected at a frequency greater than the resonance frequency at peak power of the transmission coil.

For example, the examples of power control circuits using a single coil of wire in a power receiving device may be used to power an appliance absent a battery in the appliance, i.e. a battery-free appliance. Herein, a battery-free appliance means that the appliance receives its operating energy from power transferred to its wireless power receiving coil without storing the energy in an electrochemical energy storage device, i.e. a battery. While capacitors may be thought of as energy storage devices, the capacitors that are used to select the operating frequencies for the single coil of a receiving device are very different than electrochemical batteries, which accumulate and store energy for use later via a reversible electrochemical process. The capacitors in the examples are used for operating a resonating circuit that transmits energy from a power transmission antenna and receives energy, wirelessly, at a power receiving antenna. Each of the antenna's may be a coil of wire optimized for power transmission and reception. The capacitors in these circuits are not for storing energy later used to operate the appliance. Instead, the capacitors in the power control circuits transform the energy to a voltage and current operatively selected for operating a power receiving device, such as an appliance, without the need of a battery in the device. This has significant advantages in cost and useful life of an appliance. Electrochemical batteries have limited lifetimes and may lose energy storage capacity with repeated charge-discharge cycles. Therefore, any appliance that relies on battery power, even if the batteries are rechargeable, has a limited lifetime based on the number of charge-discharge cycles that the batteries can endure before the batteries 'wear out' prematurely before the end of the useful life of an appliance. Larger batteries add expense and weight but require fewer charge-discharge cycles to operate a device. Smaller batteries reduce costs but lose capacity to operate a device sooner. Replaceable, rechargeable battery packs are even more expensive and add additional weight and volume requirements for safety and case of replacement. However, all of these trade-offs and comprises are eliminated by the examples provided herein. By utilizing a single coil in a power receiving device that is capable of being coupled to a coil in a power transmission device, an appliance becomes a simple, reliable device that eliminates any need for a battery.

In one example, an appliance utilizing a battery-free power receiving coil may be operated at a low power and a high power. In this example, a single coil's resonance frequency may be switched between a higher resonance frequency, lower power mode and a lower resonance frequency, higher power mode. A single coil of Litz wire in the receiver may receive, operatively, power from one a plurality power transmission coils. For example, a first power transmission coil may transmit power at higher frequency and lower power than a second power transmission coil. For example, the lower power setting of the single coil utilized in the appliance may be operated at a greater distance from a power transmission antenna, allowing the user interface and micro-control unit of the appliance to function, even when the appliance is not positioned directly above a power transmission antenna. Alternatively, the lower power mode may conserve energy, even when the appliance is positioned directly above a power transmission antenna. In one example, the same, single coil of a power transmission device is utilized for transferring power between the power transmission device and the appliance utilizing the power. In this example, both the power transmission device and the power receiving device may utilize a single coil, and each of those coils may be switchable between a first frequency and a second frequency with the first frequency providing a lower power mode and the second frequency providing a higher power mode. As explained previously, the resonance frequencies at peak power output of the power transmission coil of the power transmission device may be selected at a different frequency than the operating frequency of the power receiving coil of the appliance for powering the appliance at a plurality of operating modes. For example, a very low power mode may operate a micro-controller unit solely for the purpose of communication and identification of the device, if the device is located within a communications distance to a power transmission device. Next, a low power mode may provide sufficient power for operating a user interface of an appliance, but insufficient power for operating a heating element, microwave element or motor. Finally, a high power mode may provide sufficient power for operating a heating element, microwave element, motor or any other high power consuming element that may be included in an appliance. Each of the plurality of modes may be provided using a power mode switchable single coil in both the power transmission device and the power receiving device, in one example. All three modes are useful and help to conserve energy use when the devices are idle, merely paired, operating only the user interface and drawing power for operating higher power consumption elements.

Alternatively, a power receiving device may utilize a power mode switchable single coil, and a power transmission device may use a plurality of coils or a frequency switchable single coil for operating different appliances with different power needs. In one example, a combination of these modes is provided between a plurality of different power receiving devices and a power transmission device utilizing a single power transmission coil that is switchable to a plurality of power modes using a plurality of resonance frequencies for the same coil.

In one example, a low power mode may be utilized for polling appliances within a polling distance of the power transmission coil. Battery-free appliances capable of powering on for communication utilizing low power transmitted by the power transmission device may be identified by transmitting an identifier using a communications module. If higher power is needed for operation of the appliance and the appliance is properly paired with the power transmission device, both the appliance and the power transmission device may be switched to a higher power mode, for example, using their respective power control circuits for switching the operating frequencies of each of the single coils found in the appliance and in the power transmission device. When higher power is no longer needed, e.g. water is brought to operating temperature, motor is turned off, or microwave generator is deactivated, then the appliance and power transmission device may communicate and return the devices to a low power mode for operating the device interface and/or maintaining communications between the appliance and the power transmission device. Alternatively, if a receiving device is not capable of activating at low power, sensors in the power transmission device may determine if the receiving device is 'dumb' device, such as a pan or pot, and the power transmission device may test the device by providing additional power to determine the nature of the receiving device. If the device fits a specified profile compatible with the power transmission device, the power transmission device may operate its single coil at the high power mode of the single coil. For example, this may heat the pan to a desired temperature. In one example, a user interface on the power transmission device will allow a user to select a high power mode of the single coil for cooking with a pan capable of being heated by its power transmission coil.

In one example, an electric motor of an appliance is operated at variable speeds using pulse width modulation, while the power received at the power receiving coil is selected for efficiently transmitting power to the appliance. For example, the appliance may be a blender, and the blender may receive six-volt direct current via a power receiving coil in which the power received at the power receiving coil is transformed from a first current and voltage to a preferred appliance current and voltage. Transforming power from alternating current and to direct current. At the same time, the voltage relating to the alternating current may be converted from first voltage to an appliance input voltage using a circuit that steps down the voltage to an appropriate appliance input voltage. For example, if the appliance input voltage is selected to be six volts, such as for a motor that is designed to operate at six volts, then a circuit may be selected and configured that adjusts the power received at the power receiving coil to a six volt input voltage. One or more circuits may be incorporated into the electronic circuits of the power receiving coil and/or between the power receiving coil circuits and the electric motor of the appliance to operatively convert the current and voltage received by the power receiving circuit to the desired current and voltage of the electric motor. In one example, the input voltage to the electric motor is six volts, and the speed of the electric motor is controlled using a pulse width modulation circuit using the six volt input voltage as the input voltage to the six volt pulse modulation circuit.

Figure 10:
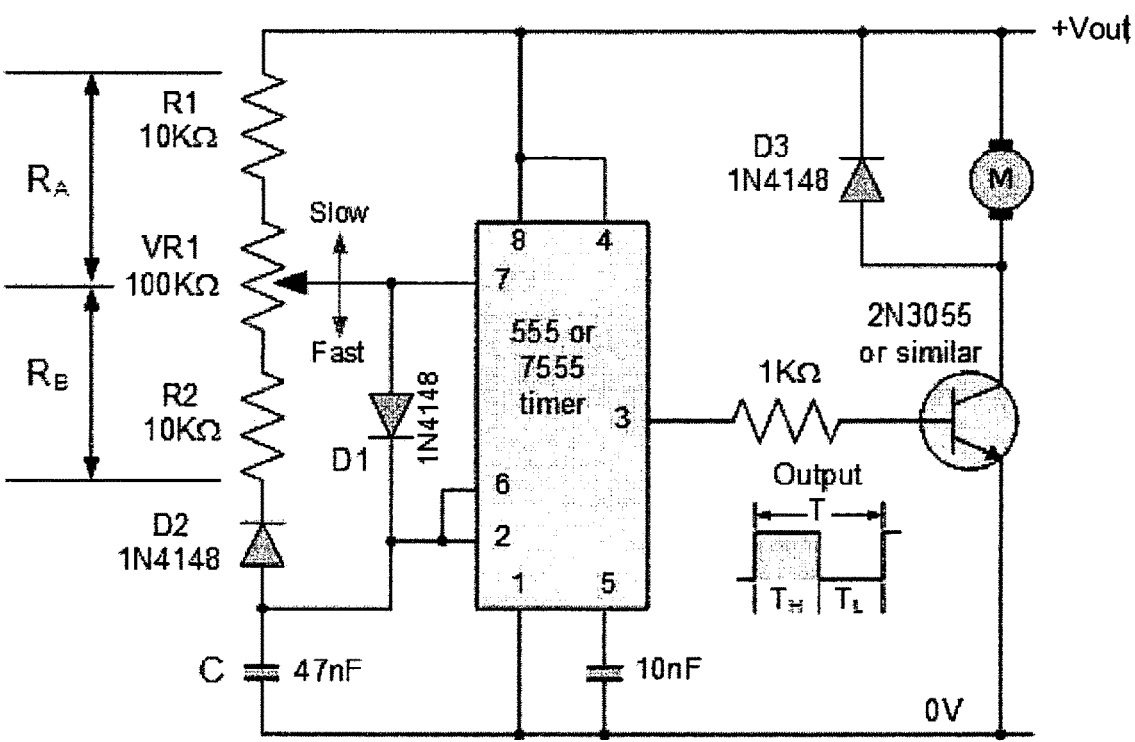
FIG. 10 illustrates an example of a pulse width modulation circuit for controlling the power delivered to a component.

For example, an illustration of a pulse width modulation circuit in FIG. 10 controls the speed of a direct current electric motor in an appliance, such as a blender, automated ice cream maker, or the like. In the example of a blender, the power receiving coil receives power from a power transmission coil by placing the power receiving coil in operative proximity to the power transmission coil and activating the blender, such as by touching a switch or providing a verbal command to activate the blender. Voice communications may be via a microphone and speech recognition software such as those offered by smart speakers, smartphones and the like. The power receiving coil includes an electronic circuit that transforms the power received to a 6-volt power supply with a sufficient amperage selected to operate the blender, for example. For example, a control circuit provides an interactive interface for a user to select a setting for the blender that selectively operates the blender at various speeds. The pulse width modulation circuit of FIG. 10 may operatively energize an electric motor of the blender by adjusting the length of time that the voltage and current are supplied to the electric motor. In FIG. 10, the timing capacitor C is charged and discharged by a current flowing through the timing networks RA and RB. An output signal at pin 3 is equal to the supply voltage switching the transistors fully "ON" and a time for C to charge or discharge increases or decreases depending upon the values of RA, RB, for example. When the capacitor is charged, the circuit immediately discharges through a diode D2 into pin 7, and the voltage at pin 3 stays at zero volts during the discharging time for the capacitor, and the transistor is switched "OFF". The length of time that it takes for the capacitor C to complete a charge-discharge cycle depends on the values selected for RA. RB and C with the period T for one complete cycle being calculated based on the time that the circuit is "ON" TH=0.693 (RA) C; the time that circuit is "OFF" TL=0.693 (RB) C; and T=TH+TL with an output frequency being calculated as f=1/T. A duty cycle for the electric motor may be selected from about 8.3% (0.5V) to about 91.7% (5.5V), for example, using a 6.0V power supply. The frequency f may be selected at 256 Hz, for example. Resistor R1 plus the "top" part of the potentiometer, VRI represent the resistive network of RA. While the "bottom" part of the potentiometer plus R2 represent the resistive network of RB above. As may be understood, values may be selected for a variety of applications for smooth and efficient operation of an electric motor in an appliance. In one example, a diode D3 is selected that protects the circuit from inductive loading of the motor. A heat sink may be used to reduce heating of the switching transistor and/or MOSFET. In this example, an apparatus may provide various output voltages and power levels by incorporating an appropriate circuit in the electronic circuitry of the appliance receiving power via a power receiving coil from a power transmission coil. For example, the initial power level available to the entire apparatus may be selected by selecting the appropriate frequency for transmission of power from the power transmission coil to the power receiving coil.

For example, a power receiving device may operate at a low power setting to establish communications with a device for transmitting power. In one example, the power for operation at the low power setting is transmitted via the power transmitting coil operating at a low power mode. Once communications are established between the power receiving device and the power transmitting device, power requirements for operating the appliance or plurality of appliances receiving power via the power receiving device's power receiving coil may be established. For example, the power receiving device may use a single coil to receive power at one or more power levels. Once communications are established at low power, for example, a frequency regime for the power transmission to the same, single coil of the power receiving device may be selected such that the power transmission coil of the power transmission device operatively, wirelessly transfers power from the same power transmission coil at higher power than the same power transmission coil was transmitting for establishing communications with the power receiving device. Then, the power received by the power receiving coil may be converted, at least in part, to direct current at a selected voltage, such as 12 volts, which may be provided to a plurality of devices within the power receiving device. For example, the 12 volts may be supplied directly to a chiller or heater, may be converted to 3 volts for operating a user interface and communications circuits of the power receiving device, and may be converted to 5 volts for operating an electric motor of the power receiving device, which may use a pulse width modulation circuit to manage the speed of the 5-volt direct current electric motor. All of these power requirements may be supplied by the power received by the same, single power receiving coil that is receiving power from a single power transmission coil, for example. For example, a chiller may be solid state chiller or compressor based, and the selection of the type of chiller used in the power receiving device makes no difference to the power transmission device. Instead, the power receiving device communicates its total power requirements to the power transmission device either directly or via an interface operatively configured to provide the operating requirements, such as via a cloud computing environment. For example, a compressor based chiller may utilize a 12-volt source to operate a compressor for cooling the. Then, based on the total power requirements, if the capabilities of the power transmission device's power transmission coil are sufficient to meet the total power requirements, then the power transmission device selects a frequency for its power transmission coil that delivers the total power requirements by wirelessly transferring power between the power transmission coil of the power transmission device and the power receiving coil of the power receiving device.

Figure 11:
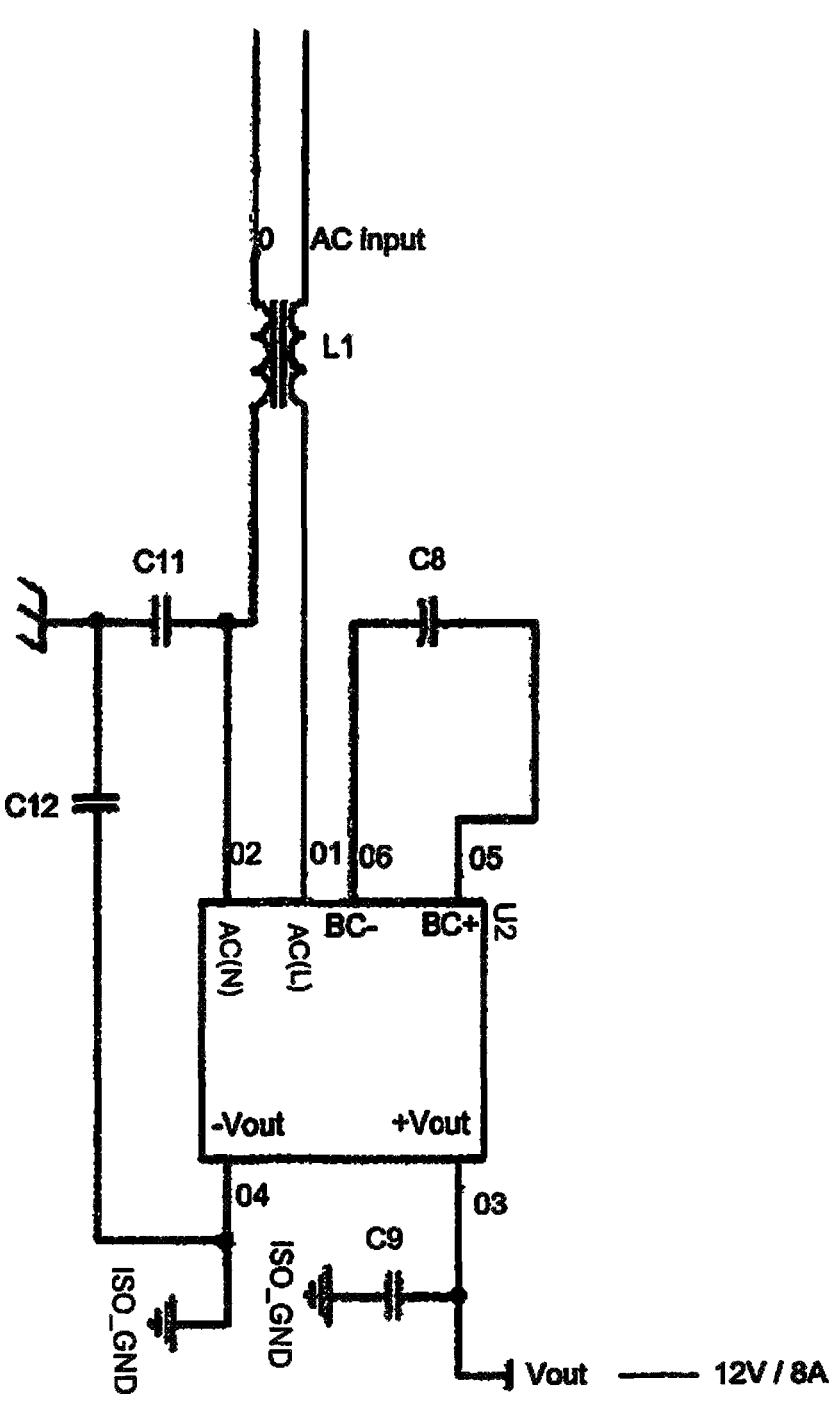
FIG. 11 illustrates an example of a prior art AC/DC converter for supplying 12 volts direct current to a component.
Figure 12:
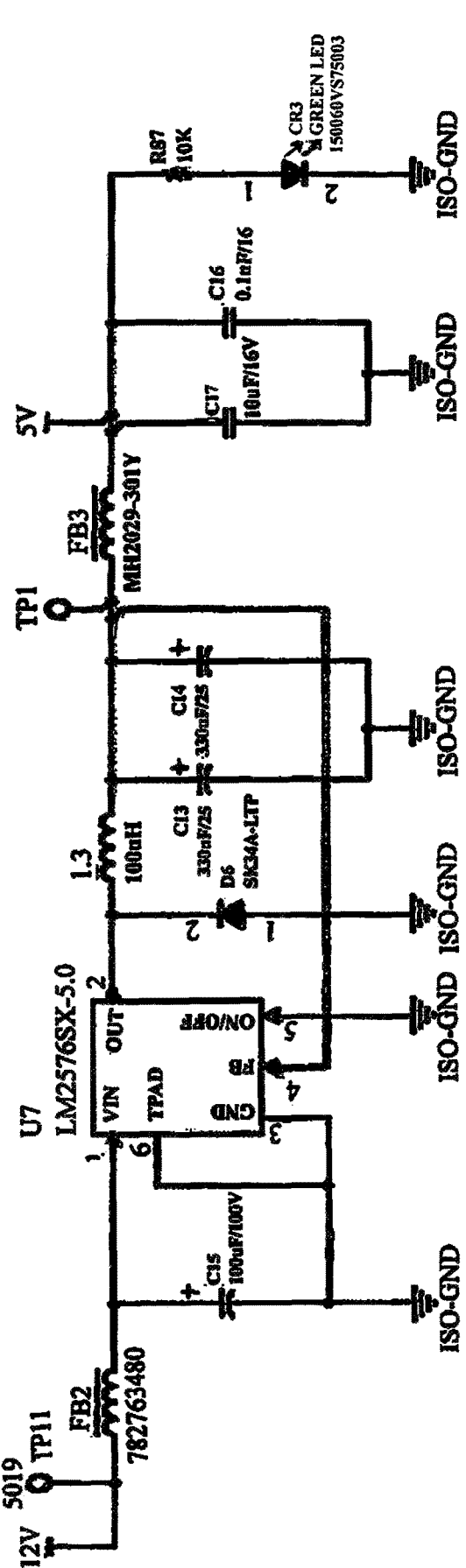
FIG. 12 illustrates an example of a DC/DC converter.
Figure 14:
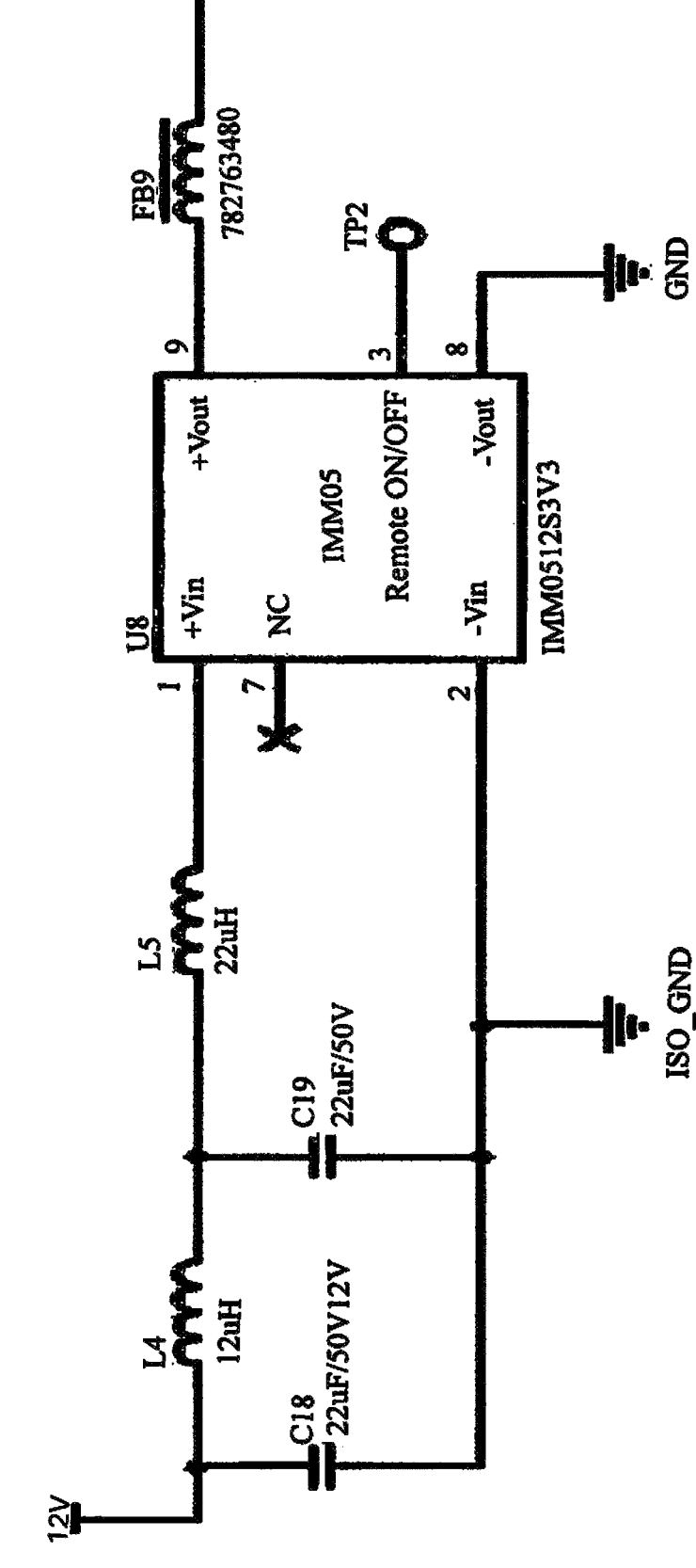
FIG. 14 illustrates another example of a DC/DC converter.
Figure 15:
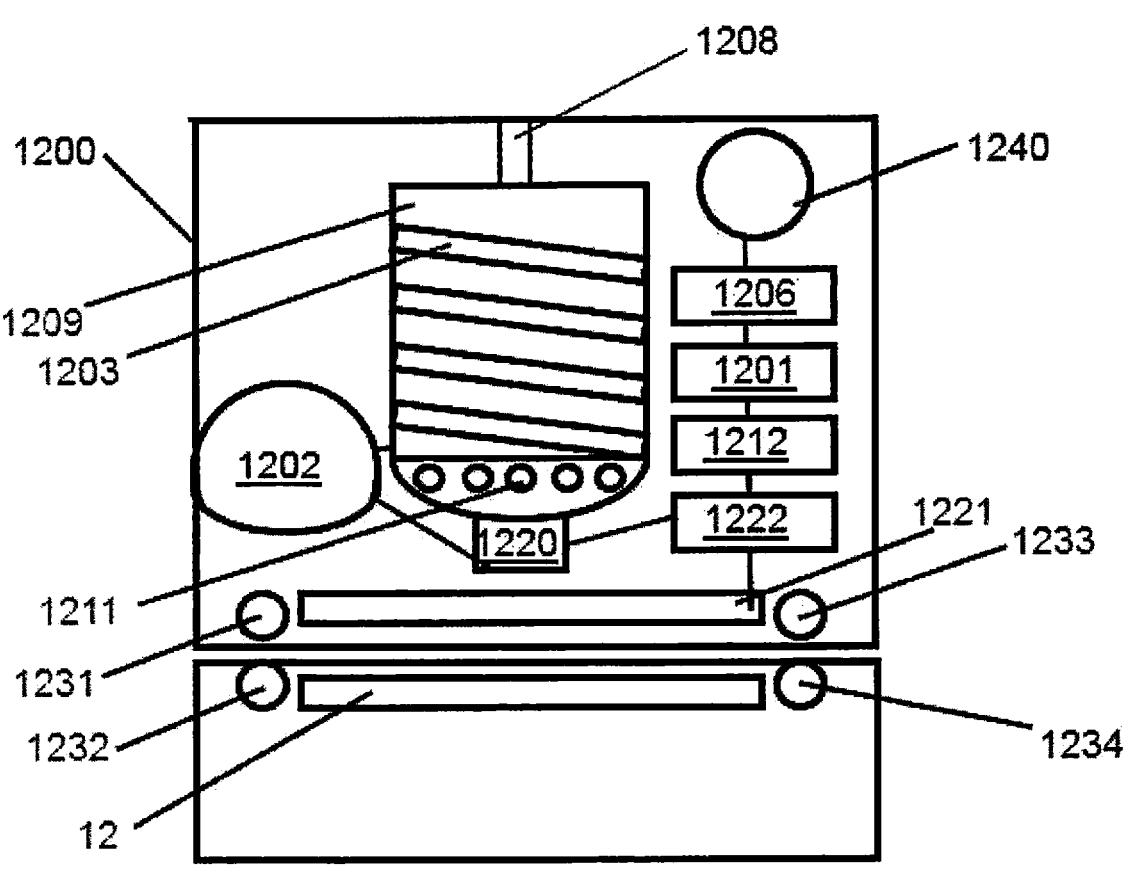
FIG. 15 schematically illustrates an example of a wirelessly charged appliance comprising a plurality of electrically powered components, all powered by a single power transmission coil wirelessly transferring power to a single power receiving coil within the appliance.

For example, FIG. 11 illustrates a prior art circuit that transforms alternating current to direct current, for example, which is known in the art. For example, FIG. 12 illustrates a circuit that steps down 12 volts to 6 volts. For example, FIG. 14 illustrates a circuit that steps the voltage down from 12 volts to 3.3 volts, and FIG. 13 illustrates another circuit that steps the voltage to 3.3 volts but at a higher current than the circuit in FIG. 13, for example. Thus, by converting the power provided by a single power receiving coil, different power levels, voltages, and currents may be provided by the same, single power receiving coil in the receiving device and same, single power transmission coil in the power transmission device, preferably allowing the same, single power transmission device to be used to power a wide array of appliances, whether powering electric motors, compressors, inductively heated pans, solid state chillers, compressor based chillers, or a combination of one, two or more of these components. In one example, as illustrated in FIG. 15, for example, an ice cream machine 1200 comprises components including an electric motor 1220, a chiller 1203 and a heater 1211, and a single power receiving coil 1221 that is coupled with a single power transmission coil 12 to operatively supply power to each of these components. For example, the chiller 1203 includes a compressor 1202 operating at 12V, the electric motor 1220 is controlled by pulse width modulation circuit 1222, such as at a voltage of 5 volts, 6 volts or another operative voltage and current suitable for rotating the container 1209 at a selected rotational speed and torque, and the heater 1211 may be a resistance heater or an inductive heater controlled by another circuit 1212 operatively controlled to heat the container 1209 during a particular phase of the process of making ice cream to a particular temperature. Both the heater and the chiller may be thermally coupled to the container 1209 for heating ice cream ingredients and subsequently chilling the ingredients while churning the ingredients to form an ice cream with air in a process of making ice cream, for example. All of the power for operating the machine may transferred from the single power transmission coil 12, as described herein, to a single power receiving coil 1221, wirelessly. For example, the single power receiving coil 1221 may be disposed on a bottom surface of the machine 1200 that may be disposed in proximity to the power transmission coil 12, while the components are electrically coupled to the single power receiving coil 1221 via electronic circuitry 1206, 1222, 1212, 1201 that operatively delivers the appropriate voltage and current to each of the components of the machine, respectively, via only the wireless coupling of the power transmission coil 12 to the power receiving coil 1221. The container 1209 may be rotated by the electric motor 1220, while a stationary stirring mechanism 1208 that is inserted into the container 1209 mixes and aerates ingredients inserted into the container during the ice cream making process. Insulation is not shown for purposes of illustration but may be provided to assist in the heating and/or chilling of the ingredients during the process. In the example illustrated schematically in FIG. 15, all of the electronic circuits 1201, 1206, 1212, 1222 are coupled one to the other and to the various components of the device; however, this simplified view is not limiting. The electronic circuits may be interconnected, chained, or isolated. For example, one of the circuits may be coupled between a central processing unit and each one of the components for powering on and controlling each of the components. As previously discussed, it may be desirable to supply a different voltage and current to each of the components, which may be done using one or more of the examples of circuits provided in FIGS. 10-14.

In one example, as illustrated schematically in FIG. 15, a power receiving device and/or a power transmission device comprise an accelerometer 1240. The hybrid power transmission system 1200 accesses the accelerometers 1240 as sensors, and unstable movements of either the power receiving device or power transmission device or relative motion between them may be identified, based on signals provided by the accelerometers 1240, as an instability. For example, the accelerometer 1240 of the power receiving device may be coupled electronically to an electronic logic circuit 1206 of the power receiving device 1200, and unsteady movement of the device 1200 may trigger activation of an electromagnetic stabilizing devices 1231-1234 located around the coils of the devices. These electromagnetic stabilizing devices may be activated to establish a strong magnetic field that is configured to magnetically stabilize the coil 1221 of the power receiving device above the coil 12 of the power transmission device, as illustrated schematically in FIG. 15.

The stabilizing devices 1231-1234 may be shaped as a ring around the coils or otherwise. In one example, the electromagnetic stabilizing devices may establish a strong magnetic field that causes an electromagnetic force to overcome inertia and friction of the power receiving device, moving the power receiving device and orienting the coil 1221 onto coil 12 by physically displacing the power receiving device with respect to the coil 12. In another example, the power receiving device may utilize permanent magnets and/or electromagnets to aid in displacing the device onto the coil 12 of the power transmission device. Alternatively or in addition to displacement, the force may be applied to stabilize the power receiving device on a surface of the power transmitting device, for example, when the power transmission device is being used for inductive power transmission/inductive heating in a boat, vehicle, airplane, spaceship or the like.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A hybrid power transmitter and appliance system comprises:

an appliance having no chemical battery or external power and being powered solely by inductive power transmission with a power receiving coil of the appliance, and the appliance having a wireless communications interface; and a hybrid hub circuit of the hybrid power transmitter, wherein the hybrid hub circuit is configured for inductively powering devices including the appliance, the hybrid hub circuit comprising:

a communications circuit comprising a separate communications antenna for communicating between the hybrid hub circuit and the appliance, wherein the communications circuit establishes a handshake mode with the wireless communications interface of the appliance and receives control information from the appliance including an appliance type;

a display, wherein the display is configured based on the control information received from the appliance;

a single power transmission coil configured for operating at at least one resonance frequency, the at least one resonance frequency selected to inductively heat pans wirelessly charge batteries, and operatively powering the appliance by determining power requirements from the control information received from the appliance and inductively transferring power from the single power transmission coil to the power receiving coil of the appliance at the at least one resonance frequency in accordance with the power requirements determined from the control information received from the appliance, wherein no other power transmission coil than the single power transmission coil is used to inductively heat pans, wirelessly charge batteries or operatively power the appliance, and the single power transmission coil inductively transfers power from the hybrid power transmitter to the appliance using the single power transmission coil at a power level selected by the hybrid hub circuit after the appliance is identified in the handshake mode; and a controller, wherein the controller controls the power transferred from the single power transmission coil to the appliance based on the control information received from the appliance via the separate communications antenna of the communications circuit.

2. The system of claim 1, wherein the at least one resonance frequency comprises a first resonance frequency for inductively heating pans, a second resonance frequency for charging batteries, and a third resonance frequency for operatively powering the appliance, and first resonance frequency and the third resonance frequency are different resonance frequencies.

3. The system of claim 2, wherein the first resonance frequency is a different frequency than the second resonance frequency and the third resonant frequency.

4. The system of claim 1, wherein the controller controls the power transmitted by a pulse modulation circuit.

5. The system of claim 4, wherein the pulse modulation circuit is pulse width modulated.

6. The system of claim 1, wherein the single power transmission coil is embedded in a heat resistant material that does not impede significantly electromagnetic fields from the single transmission coil.

7. The system of claim 1, wherein the at least one resonance frequency of the single power transmission coil is selected by the hybrid power transmitter based upon an interaction between a load and the single power transmission coil.

8. The system of claim 7, wherein the interaction is electromagnetic feedback to the single power transmission coil from the load.

9. The system of claim 1, wherein the appliance comprises a separate communications antenna for communicating between the hybrid power transmitter and the appliance.

10. The system of claim 1, wherein a remote mobile device controls the hybrid power transmitter.

11. The system of claim 10, wherein the remote mobile device controls the power receiving device.

12. The system of claim 1, further comprising a protective surface of the hybrid power transmitter, wherein the protective surface is interposed between the single power transmission coil and the appliance, the protective surface is transparent, and the display of the hybrid hub circuit of the hybrid power transmitter displays controls for operation of the hybrid power transmitter through the protective surface.

13. The system of claim 12, wherein the controls are touch sensitive such that a user is capable of operating the hybrid power transmitter for transmitting power to the appliance by touching the touch sensitive controls visible through the protective surface.

14. The system of claim 13, wherein the hybrid power transmitter is controlled by a user's voice.

15. The system of claim 13, wherein the protective surface is of a chemically strengthened alkali-aluminosilicate.

16. The system of claim 12, wherein the controls are displayed on a touch sensitive organic light emitting diode panel protected by the protective surface.

17. The system of claim 1, further comprising an electromagnetic stabilizer for securing a power receiving device above the single power transmission coil.

18. The system of claim 1, wherein the single power transmission coil comprises a number of turns between 4 and 30.

19. The system of claim 18, wherein the single power transmission coil comprises the number of turns between 10 and 20.

20. The system of claim 18, wherein the single power transmission coil is comprised of Litz wire.

21. The system of claim 20, wherein the single power transmission coil comprises an outside diameter selected from 10 cm to 50 cm, and an inside diameter of the coil selected from 4 cm to 20 cm.

22. The system of claim 1 further comprising a switch, wherein the at least one resonance frequency is a plurality of resonance frequencies, and the switch selects between the plurality of resonance frequencies.

23. The system of claim 22, wherein the switch is a solid state relay.

24. The system of claim 23, wherein the plurality of resonance frequencies are selected in a range from 10 kHz to 60 kHz and in a range from 80 kHz to 1 MHz.

25. The system of claim 1 further comprising a control circuit that controls the input voltage across the single power transmission coil, and the control circuit is configured such that the control circuit selects from both direct current and alternating current input voltages.

26. The system of claim 25, wherein the control circuit is configured to select input voltages from 3.3 VDC to 48 VDC and from 110 VAC to 250 VAC.

27. The system of claim 1, further comprising both a voltage regulation control circuit and a resonance frequency switching circuit.

28. The system of claim 1, wherein the communication circuit receives control information from the appliance during the handshake mode, and information necessary to safely transmit power to the power receiving device is received and analyzed prior to initiating a power mode transmitting higher power than transmitted by the single transmission coil during the handshake mode.

29. The system of claim 28, wherein the hybrid power transmitter accesses a remote database if additional information is necessary before transmitting higher power to the power receiving device.

30. The system of claim 1, wherein an electric motor of the appliance is operated at variable speeds using pulse width modulation.

31. The system of claim 30, wherein the appliance comprises a plurality of components, each of the plurality of components requiring a different voltage or current, and the single power transmission coil of the hybrid transmitter is the sole source of power to power the receiving device, the single power transmission coil providing all of the power for each of the plurality of components.

32. The system of claim 1, wherein the controller controls voltage across the single power transmission coil.

33. The system of claim 32, wherein the voltage across the single transmission coil is selected from 3.3 VDC to 48 VDC or 110 VAC to 250 VAC.

34. The system of claim 33, wherein the voltage across the single transmission coil is from 115 VAC to 124 VAC.

* * * * *